(12) United States Patent
Lie

(10) Patent No.: US 8,259,531 B2
(45) Date of Patent: Sep. 4, 2012

(54) METHOD FOR REFLECTION TIME SHIFT MATCHING A FIRST AND A SECOND SET OF SEISMIC REFLECTION DATA

(75) Inventor: Espen Oen Lie, Bergen (NO)

(73) Assignee: Statoil ASA, Stavanger (NO)

( * ) Notice: Subject to any disclaimer, the term of this patent is extended or adjusted under 35 U.S.C. 154(b) by 566 days.

(21) Appl. No.: 12/415,264

(22) Filed: Mar. 31, 2009

(65) Prior Publication Data

US 2009/0245023 A1  Oct. 1, 2009

Related U.S. Application Data

(60) Provisional application No. 61/064,866, filed on Mar. 31, 2008.

(51) Int. Cl.
*G01V 1/00* (2006.01)
(52) U.S. Cl. .......................................................... 367/51
(58) Field of Classification Search ................ 367/50–51
See application file for complete search history.

(56) References Cited

U.S. PATENT DOCUMENTS 6,574,563 B1    6/2003  Nickel
7,626,887 B2 *  12/2009 Aarre et al. ..................... 367/50

FOREIGN PATENT DOCUMENTS

EP   1 879 052 A2    1/2008
GB   2 437 390 A    10/2007
WO   WO 99/67660    12/1999
WO   WO-02/075363 A1    9/2002
WO   WO-2006/064023 A1    6/2006

OTHER PUBLICATIONS

Kjelstadli, "Quantitative History Match of 4D Seismic Response and Production Data in the Valhall Field", Society of Petroleum Engineers, 2005.*
Kjelstadli, "Quantitative History Match of 4D Seismic Response and Production Data in Valhall Field", Society of Petroleum Engineers, 2005.*
Hatchell et al., "Rocks under strain; Strain-induced time-laspe time shifts are observed for depleating reservoirs", Leading Edge, Society of Exploration Geophysicists US, Dec. 2005, pp. 1222-1225, vol. 24, No. 12, XP002538591.

* cited by examiner

*Primary Examiner* — Eric Bolda
*Assistant Examiner* — Krystine Breier
(74) *Attorney, Agent, or Firm* — Birch, Stewart, Kolasch & Birch, LLP

(57) ABSTRACT

A method is disclosed for reflection time shift matching a first and a second set of seismic reflection data (10,30) comprising first and second seismic reflection traces (1,3) with series of generally corresponding seismic reflections (11,31). The second set of seismic data (30) comprises at least one laterally extending series (40) of new seismic events (4) not present in the first set of seismic data (10). Reflection time shifts (22) are calculated as required for matching seismic reflections (31) of the second reflection traces (3) of the second seismic reflection data (30) with corresponding seismic reflections (11) of the first reflection traces (1). The calculation of the time shifts (22) are made by calculating coefficients of basis function estimates such as Legendre polynomials in order to save calculation effort.

19 Claims, 15 Drawing Sheets

Comparison of true sine shaped time shift (22t) and an estimated time shift based on Legendre polynomials, with (22n) and without (22ts) a new seismic event and further an estimated time shift including a new event using a time varying variation of noise (22tse).

1: Base trace made by random acoustic impedance log convolved with a Ricker pulse.
2: The base trace with a synthetic time shift.
3: The base trace with a synthetic time shift and a new event introduced.

Raw division of $(d_m - d_b)$ and $\delta_t d_m$

A sine shaped time shift and a calculated 5th order Legendre polynomial fit

2: Base trace w/ time shift,
1: Base trace
2c: Base w/ time shift corrected
2d: Original difference
2cd: Difference after correction

*Fig. 5*: Comparison of true sine shaped time shift (22t) and the estimated time shift (22ts) based on Legendre polynomials.

3: Base tr. w/t. sh.+ new event  1: Base trace  3c0: Time shift only corrected  3d0: Difference after correction  3d0: Original difference  3cd: Correct new event difference, i.e. the negative of the new event

*Fig. 7*: Comparison of true sine shaped time shift and estimated time shift based on Legendre polynomials, with (22n) and without (22ts) a new seismic event (4), see Fig. 6

Fig. 8: Calculated time varying noise: $\sigma = (|H(d_{4d})|^2 + 1^2)^{1/2}$

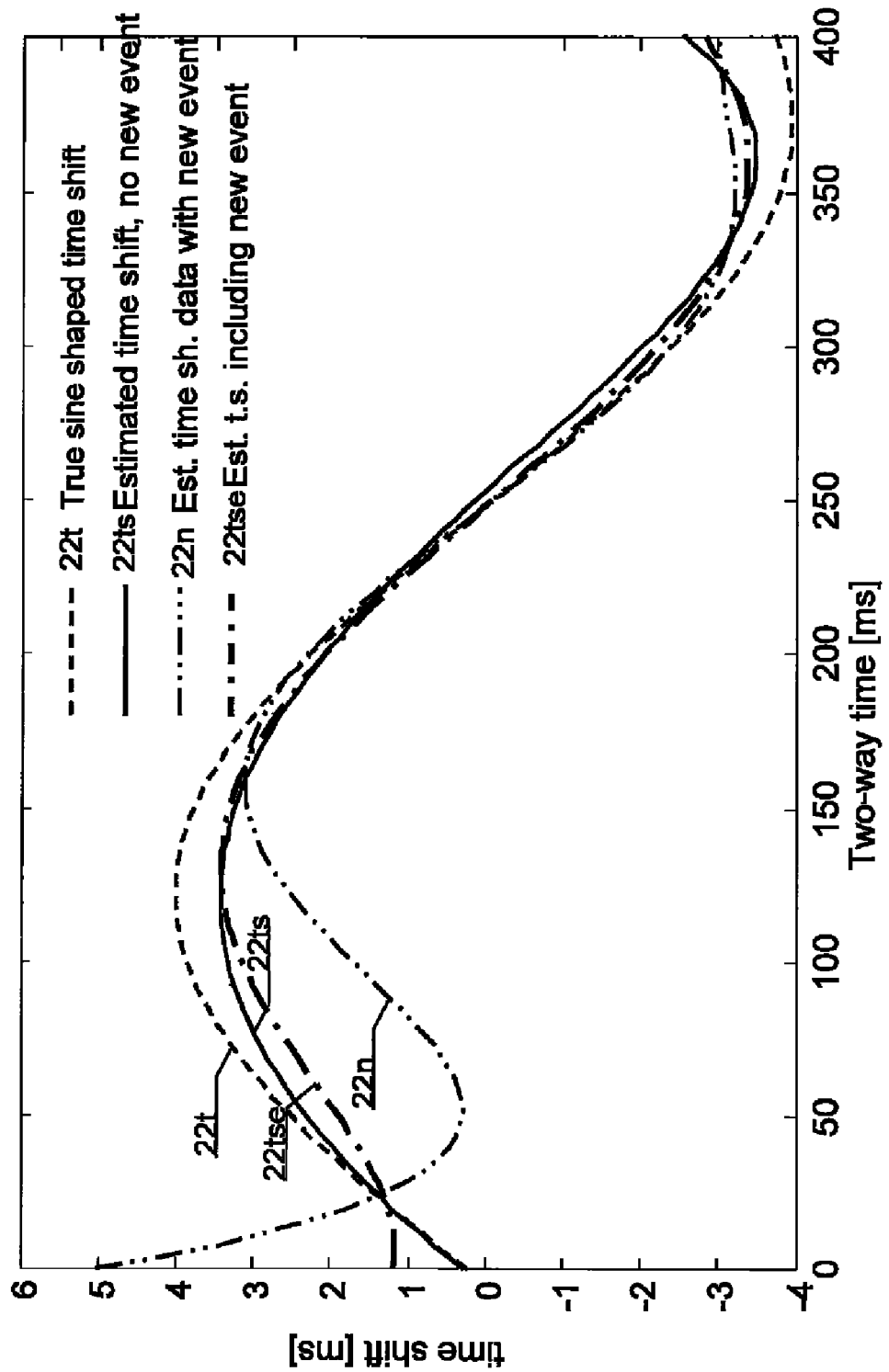
*Fig. 10:* Comparison of true sine shaped time shift (22t) and an estimated time shift based on Legendre polynomials, with (22n) and without (22ts) a new seismic event (4 of Fig. 9), and further an estimated time shift including a new event using a time varying variation of noise (22tse).

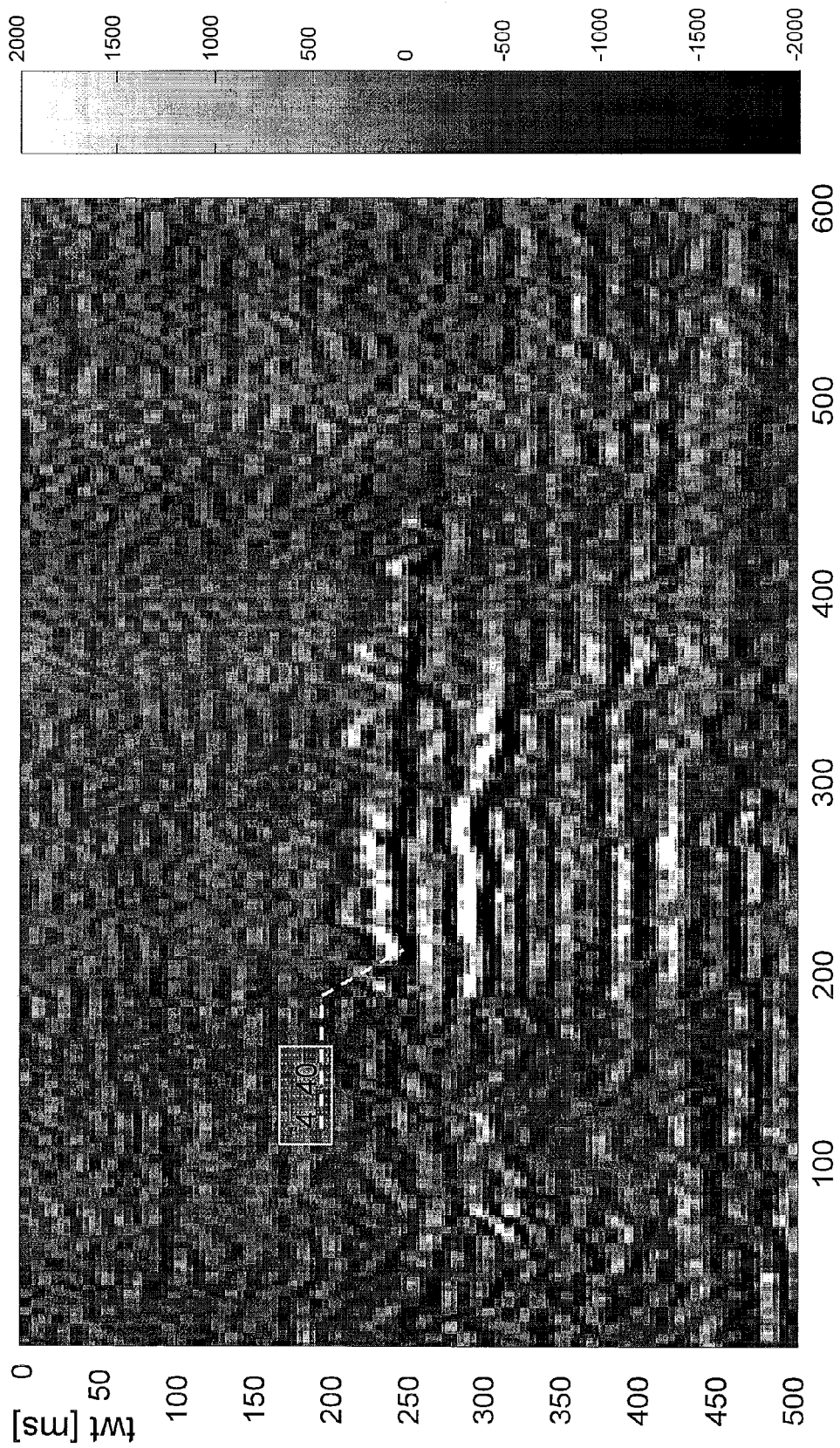
*Fig. 11*: Original raw difference between a first set of seismic data (10) and a second, later acquired set of seismic data (30) comprising a generally horizontal "flatspot" series (40) of new events (4) in the traces (3).

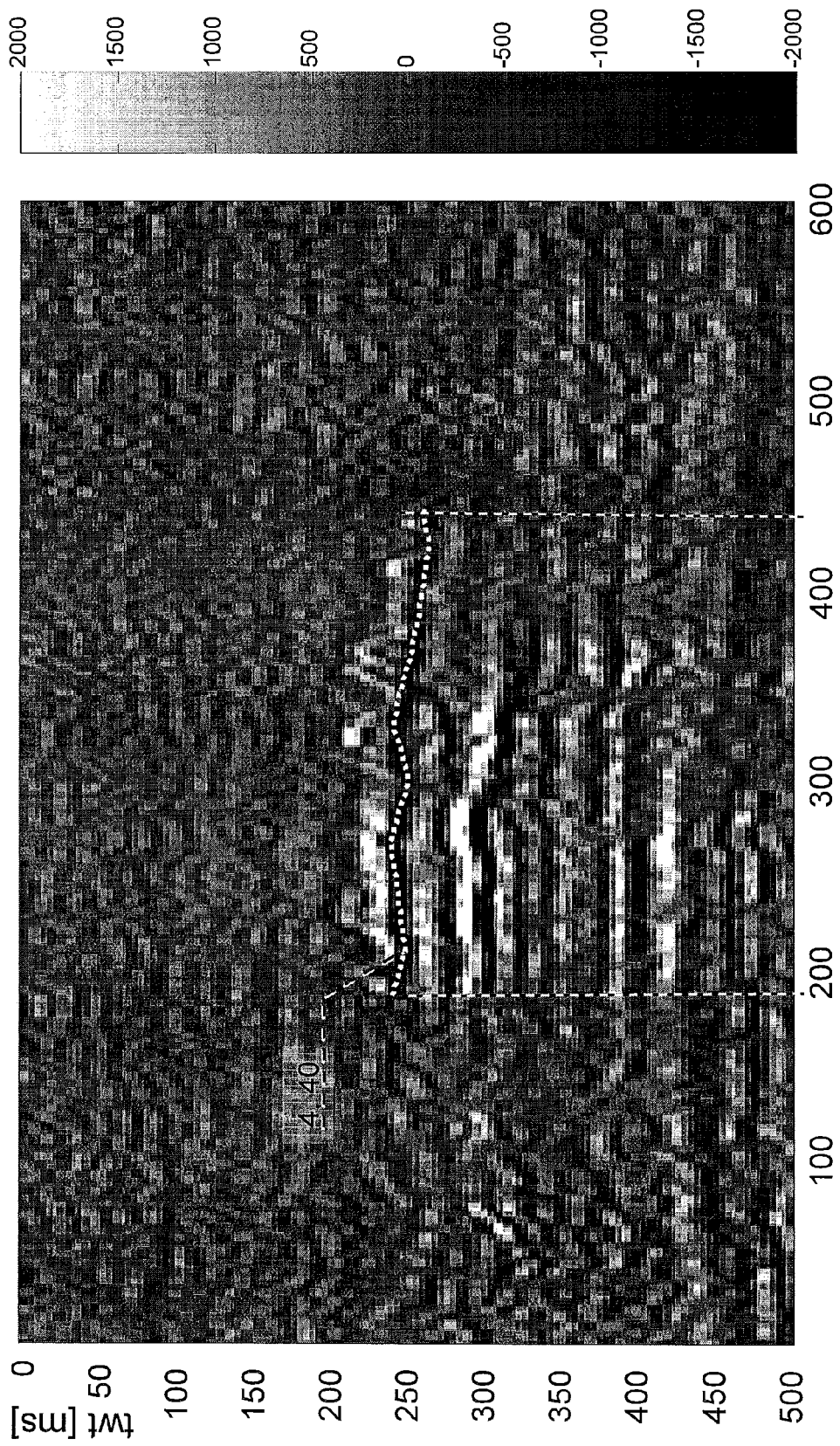
*Fig. 12*: Original raw difference as for Fig. 11, with the interpreted, more or less horizontal "flatspot" series (40) of new events (4) in the traces (3) indicated by a broken white line.

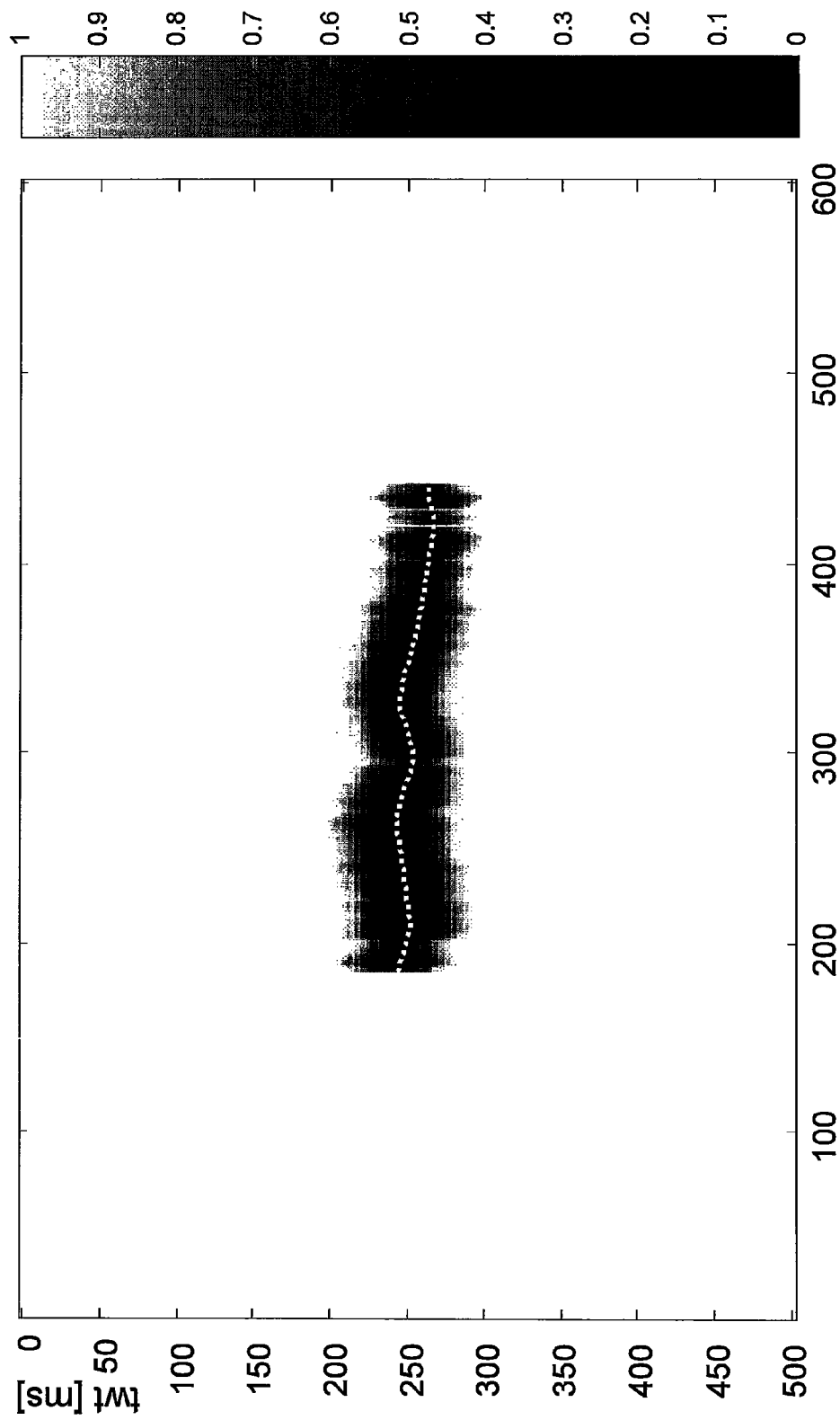
*Fig. 13*: The "flatspot" series (40) of Fig. 12 interpreted as time varying noise along the vertical two way time of the underlying traces picked from the amplitude and time position over a generally unitary noise level elsewhere, corresponding to Fig. 8.

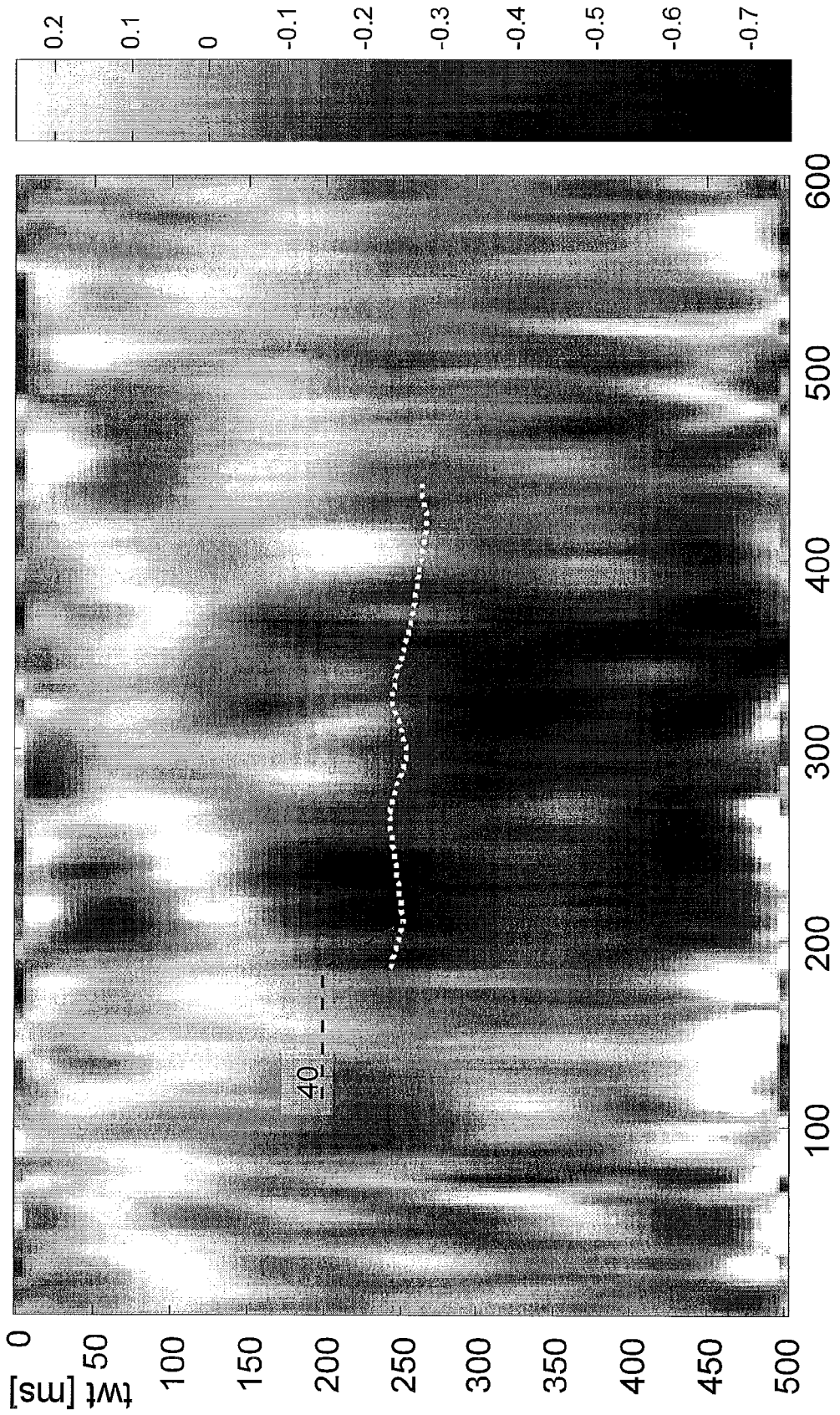
Fig. 14: Estimated timeshift calculated according to the present invention using polynomial approximation - not adapting to time varying variance due to new event

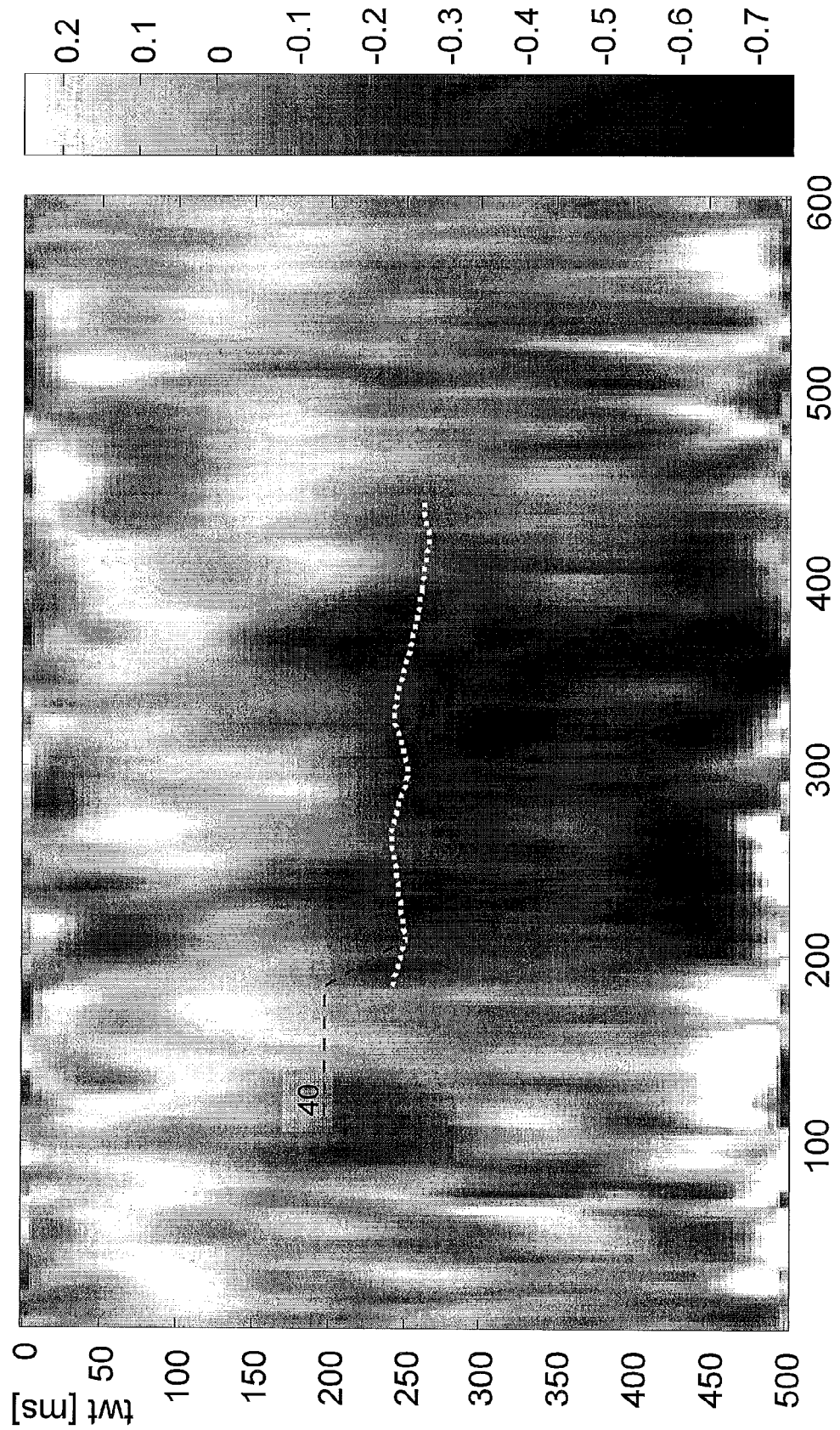
*Fig. 15*: Estimated timeshift calculated according to the present invention using polynomial approximation and allowing time-varying variance from the interpreted flatspot.

METHOD FOR REFLECTION TIME SHIFT MATCHING A FIRST AND A SECOND SET OF SEISMIC REFLECTION DATA

This Nonprovisional application claims priority under 35 U.S.C. §119(e) on U.S. Provisional Application No. 61/064,866 filed on Mar. 31, 2008, the entire contents of which are hereby incorporated by reference.

The present invention relates to a method for reflection time shift matching a first and a second set of seismic reflection data.

The invention relates generally to correction of time shifts between seismic data sets acquired at different times during the life of a petroleum field. In an embodiment, the invention provides a method for correcting time shifts differences between two seismic data sets under the further constraint that new seismic events occur in the data, the new seismic events possibly having no counterpart in previously measured seismic data sets.

BACKGROUND ART

For finding petroleum fluids in geological strata the seismic method is the prime method. Seismic signals are generated at the surface and propagate downward and are partly reflected by every seismic impedance contrast. Seismic impedance is the product of seismic acoustic velocity and density. The seismic signals are acquired by a series of seismic sensors after having been reflected, and the time series collected at a seismic sensor for each seismic transmission from the seismic source is called a seismic trace. For monitoring or controlling the development of the fluid content of the geological strata during petroleum fluid production so-called time-lapse seismic data are conducted during the life of the petroleum field. Material changes within the geological strata may cause changes of the local seismic impedance and may be seen as a time shift between seismic data acquired at different times during petroleum production. Knowing parameters about the material changes of the geological strata may provide key information to how to control the petroleum fluid production such as adjusting the production rate of gas or petroleum, adjusting the depth of which petroleum fluids are produced, or determining injection rates of gases or fluids in order to support the petroleum fluid production.

U.S. Pat. No. 6,574,563 describes a non-rigid method of processing a first and a second seismic data set acquired from the same underground area. The method is referred to as the "NRM method". The NRM method comprises arranging the first and the second seismic data sets into sample sets, generating displacement vectors that indicate a direction and an amount for each sample individually from one data set may be moved to improve the match with corresponding samples from the other sample set. The process is completed by conducting the suggested move of one of the set of samples. The method has the advantage that differences between first and second seismic time sets that may be explained by noise may be attenuated, such as noise due to different source characteristics, differences between the acoustic sensors in the streamers used, positioning and depth differences for the source and the seismic streamers, data acquisition differences, and different processing. In a basic embodiment the method may be constrained to only suggest and conduct vertical movement of samples, as a good match may almost always be obtained if one tries to correlate samples along a seismic reflector.

A condition for the so-called NRM method to work well is that counterparts actually exist for generally all samples of both seismic data time sets to be compared. Seismic events that have no significant counterpart may incur the method trying to move a seismic event comprised by a group of samples, say, a new seismic horizon in one of the seismic data time sets, to better fit a seismic event actually not occurring in another seismic data time set, and thus forcing the displacement of other seismic events in the seismic data time set in an inappropriate way.

The methods which have been developed previously for matching time shifted seismic data may be significantly improved in order to provide an even better match of seismic traces. Further, background art methods have little tolerance for new seismic events, as the matching process may force non-relevant matching onto the seismic data while locally forcing a displacement of otherwise matching parts of time shifted seismic data.

BRIEF SUMMARY OF THE INVENTION

According to the present invention, there is provided a method for calculating time shifts (22) for detecting material changes in petroleum bearing strata during petroleum production activities, the method comprising:

at a first time ($t_0$), acquiring a first seismic reflection data set (10) of first reflection traces (1) comprising a first series of reflections (11), conducting petroleum production activities, at a later time (t), acquiring a second seismic reflection data set (30) of second reflection traces (3) comprising second series of reflections (31) generally corresponding to said first series of reflections (11), calculating said reflection time shifts (22) for matching said second series of reflections (31) of said second traces (3) with corresponding said first reflections (11) of said first reflection traces (1), calculating basis function estimates of said time shifts (22) while allowing for time invariant noise in said first and second series of reflections (11, 31).

The main advantages of the matching process according to the preferred embodiments of the present invention are as follows. First, an advantage is the improvement of the process of calculating time shifts as such in order to better match a first set of seismic reflection data acquired at a first time to a generally time-shifted second set of seismic reflection data, the second set of seismic data acquired at a second time t, by calculating said time shifts by calculating coefficients of basis function estimates. The calculated time shift may then be applied to one of the seismic data sets or used as a parameter itself for displaying changes. Calculating basis function estimates of the time shifts may significantly reduce the calculation efforts compared to conducting the high number of operations required for calculating the time shift for moving every time sample individually along every seismic trace according to the background art.

Secondly, an advantage is the improvement of the process of conducting time shifts in order to better mach a first set of seismic data acquired at a first time to generally time-shifted second set of seismic data when the time-shifted second set of seismic data comprises one or more new seismic events. The method according to the invention may comprise identifying new seismic events and interpreting said new events as time (or spatially) varying variance in addition to the time invariant noise outside said new seismic events. The method according to this preferred embodiment present invention provides an improved match between time shifted sets of seismic reflection data acquired at different times, and provides tolerance for new seismic reflection events occurring in at least one of the sets of seismic data.

In an advantageous embodiment of the invention, the calculation of time shifts (22) comprises calculating coefficients of Spline functions. An advantage is that local changes in a spline function will not adversely affect the seismic reflection trace globally.

The calculation of time shifts may advantageously comprise calculation of coefficients of Spline functions, Legendre polynomials, Taylor series, or Fourier series.

In a preferred embodiment of the invention, spline functions will be applied, as a spline function may allow for local new events without affecting globally along the entire two-way reflection time. Most preferably, so-called b-splines will be applied.

BRIEF DESCRIPTION OF THE DRAWINGS

Embodiments of the present invention will now be described by way of example with reference to the accompanying drawings, in which:

FIG. 10 shows a Cartesian diagram with time shift estimates similar to FIG. 7, additionally displaying a curve of a time shift correction for a long wave sine-formed time shift while allowing for a high-amplitude new event included as a time varying variation of noise, the additional curve calculated according to the method of the present invention;

FIG. 11 shows an original raw difference between a first set of seismic data acquired at a first time at the Grane petroleum field of the North Sea, and a generally time-shifted second set of seismic data acquired at a later time. The second set of seismic traces includes a reflection horizon, a so-called "flat spot" which is one of the main targets of geological interpretation and also a main problem of the present invention;

FIG. 12 is identical to FIG. 11 with the above-mentioned "flat spot" indicated by a broken line extending between offsets from 180 m to 440 m;

FIG. 13 shows the flat spot series of the seismic section difference of FIGS. 11 and 12 interpreted as time varying variance such as illustrated in FIG. 8;

FIG. 14 illustrates an estimated time shift for a set of seismic traces, calculated according to the present invention using polynomial approximation—not including the use of the method of adapting the time shift correction to time varying variance due to the new event; and, FIG. 15 illustrates the same as FIG. 14 except for the time shift calculated according to an embodiment of the present invention, adapting to time varying variance due to the generally laterally extending series of new events.

SPECIFICATION OF EMBODIMENTS OF THE INVENTION

Figure 1:
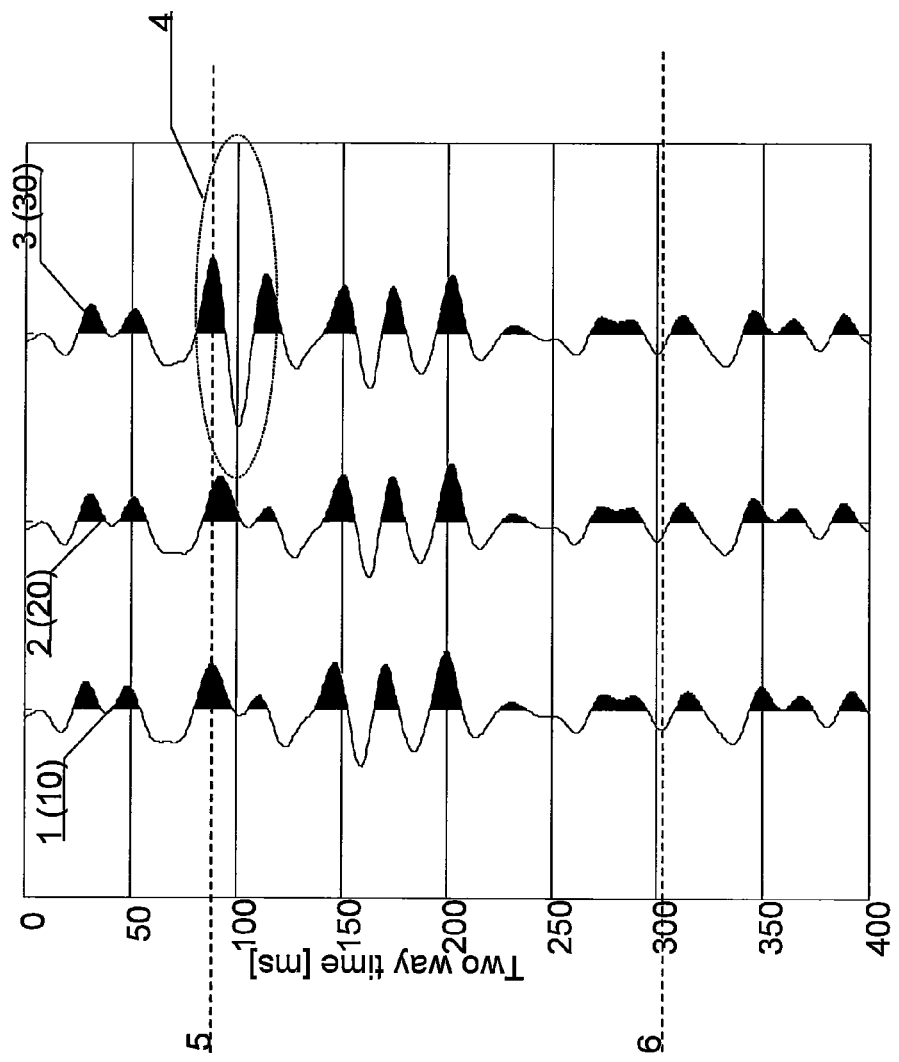
FIG. 1 illustrates three vertically arranged synthetic seismic traces showing instantaneous amplitude. The left trace indicated by "1" is a random base trace. The middle trace indicated by "2" is the same base trace but given a synthetic time shift. The right trace named "3" is the base trace with a synthetic time shift such as for the trace indicated by "2", and additionally provided with a new event.

A base reflection trace 1 is formed by making a random acoustic impedance log of an imagined or real geological column. Each layer's acoustic impedance is the acoustic velocity multiplied by the density. The random impedance log used here has been convolved with a Ricker pulse, and is illustrated by 1 in the left third of FIG. 1. The random reflection trace 1 so produced is imagined to having been acquired at a first time $t_0$. The middle trace indicated by reference numeral 2 is the same randomly made base trace, but given a synthetic time shift, here a sine function time displacement. The time shifted reflection trace 2 is imagined to having been acquired at a second, later time t. (The second time t may also be an earlier time.) One will see from the traces 1,2 that about 0.10 seconds, marked by a time indicator line 5, corresponding ripples occur later in the time shifted trace 2 than for the base trace 1, and about 0.30 s, marked by another time indicator line 6, the pulses of the time shifted trace 2 appear earlier in the base trace 1 seismogram. The NRM method according to U.S. Pat. No. 6,574,563 is capable of matching such sets seismic reflection data 20 more or less purely time shifted traces 2 bit by bit individually to a first set of seismic reflection data 10 of base traces 1.

The right reflection trace 3 is the base trace 1 with a synthetic time shift such as indicated by 2, and additionally provided with a new event 4, here a strong negative reflection which has no corresponding feature neither in the base trace 1 nor in the purely synthetically time shifted reflection curve 2. Such a new seismic event 4 in the "time shifted and new event" trace 3 is not easily adapted in automatic methods of the background art, as existing automated trace matching methods would try to match such a non-matching new seismic event 4 with other, non-related seismic reflections of the first trace 1 being subject to the matching process. The forced matching of such a new event 4 with non-related reflections of the base trace 1 may force an improper time shift to the region below (or above) the new event, possibly falsely emphasizing non-real differences between the two sets of traces 1, 3 that are not material.

The main purposes of the matching process according to the preferred embodiments of the present invention are as follows. First, the method is for conducting time shifts in order to better match a first set of seismic data 10 acquired at a first time $t_0$ a generally time-shifted second set of seismic data 20,30, the second set of seismic reflection data 20,30 being acquired at a second time t. Even calculating and displaying the time shift as such, before actually applying the calculated time shift to one of the seismic data sets, will provide valuable information about changes in the seismic impedance. Secondly, the method is for conducting time shifts in order to better match a first set of seismic reflection data 10 acquired at a first time $t_0$ to a generally time-shifted second set of seismic data reflection 30 when the time-shifted second set of seismic data 30 comprises one or more new seismic events 4. The second set of seismic data 30 is acquired at a second time t.

The method is primarily intended for matching time-shifted seismic data in order to detect material changes in the geological strata causing the new seismic event 4. The material changes are assumed to have occurred in the interval between the first time $t_0$ and the second time t. Such a new seismic event 4, that is, a significant local change of acoustic impedance, may be due to either a gas injection or the development (or disappearance) of a gas/liquid interface in a petroleum reservoir, a significant change of pressure of a gas containing layer, an introduction of a new oil/water contact in a geological formation, a deposition of a chemical precipitate in a geological layer, or artificial injection of a fluid containing sedimentary particles having settled in a geological layer, or any other physical change giving rise to a significant change of the acoustic impedance of part of the geological column subject to seismic investigation.

Other purposes of matching the two seismic data sets 10,30 may be for comparing seismic data acquisition equipments and methods used during the field acquisition of the two different seismic data sets 10,30.

The more or less linear time shifts occurring in the time shifted data set 20 and the time shifted new event data set 30 may be due to a number of seismic data acquisition parameters such as:

different source characteristics,
differences between the acoustic sensors in the streamers used,
differences in sampling rates,
differences in amplification, pre-filtering of acoustic measurements, post-filtering of collected traces,
differences in stacking procedures, i.e. full stacking vs. near stacking or far stacking,
differences in migration algorithms or parameters,
lateral or in-line source or streamer positioning differences due to navigation errors and streamer drift, and
and depth differences for the source and the seismic streamers.

In general, the first and second sets of seismic data may have been acquired with a separation in time extending over months or years. Due to one or more of the above reasons, time shifts for first data sets 10 and second or consecutive seismic data sets 20,30 acquired at different times with a long time delay, such as on the scale of months or years are rarely constant. In addition to pure time shifts, as mentioned above, there might also be amplitude differences and differences in the wave spectra. It is desirable to distinguish between differences between the data sets that are due to time shifts, and differences that are due to changes of amplitudes. There may be significant new events due to petroleum fluid production, fluid migration or fluid injection. An embodiment of the method of the present invention is presented based on synthetic data in order for enabling comparison with a known set of base data. A non-commercial test on seismic data from the Grane petroleum field in the North Sea is provided to demonstrate the applicability of the method for real seismic measurements.

As explained for FIG. 1, the synthetic base seismic trace 1 is calculated based on reflections from a series of random series of natural-similar acoustic impedances and convolved with a Ricker pulse, and is has been acquired at a first time $t_0$. The middle trace indicated by reference numeral 2 is the same trace but given a synthetic time shift, here a low-frequency sine function time displacement, please see FIG. 3, numeral 22*t*. The second seismic trace 2 is imagined to having been acquired at a second, later time t.

The right trace 3 is made from the base trace 1 with a synthetic time shift such as indicated by 2, and additionally provided with a new event 4, here a strong negative reflection which has no correspondence in the base trace 1 or the synthetically time shifted curve 2.

The 4D seismic data may be formulated as follows:

$$d_m(t) = d_b(t+\Delta t) + d_{4D}(t) + \epsilon \qquad \text{(eq. I)}$$

where $d_m(t)$ are the seismic data of the traces as a function of time (or depth) of the later, second set of seismic data acquired at a time t. The first term on the right side of the equation, $d_b(t+\Delta t)$ are the seismic data of the traces as a function of time (or depth) of the initial, first set of seismic data 10 acquired at an initial time $t_0$ plus the time shift $\Delta t$ which is the small time difference for each corresponding measurement (forming peaks and troughs) of the first seismic trace 1 and the second seismic trace 2 or 3. The second seismic trace may be acquired months or years after the first. The term $d_{4D}(t)$ on the right side is a new seismic event 4, and the term $\epsilon$ is noise.

Equation I above may be Taylor expanded to the first time derivative resulting in the following:

$$d_m(t) = d_b(t) + \left(\frac{\partial}{\partial t} d_b\right)\Delta t + d_{4D}(t) + \varepsilon \qquad \text{(eq. II)}$$

This equation may be rearranged to find the difference between the seismic data as measured and the base data:

$$d_m(t) - d_b(t) = \left(\frac{\partial}{\partial t}d_b\right)\Delta t + (d_{4D}(t) + \varepsilon) \quad \text{(eq. III)}$$

In this equation everything is known except the time shift $\Delta t$ and the last term $(d_{4D}(t)+\varepsilon)$ is known. If a raw division by $$\left(\frac{\partial}{\partial t}d_b\right)$$

is made, we obtain $$\frac{d_m(t) - d_b(t)}{\left(\frac{\partial}{\partial t}d_b\right)} = \Delta t + \frac{(d_{4D}(t) + \varepsilon)}{\left(\frac{\partial}{\partial t}d_b\right)} \quad \text{(eq. IV)}$$

Figure 2:
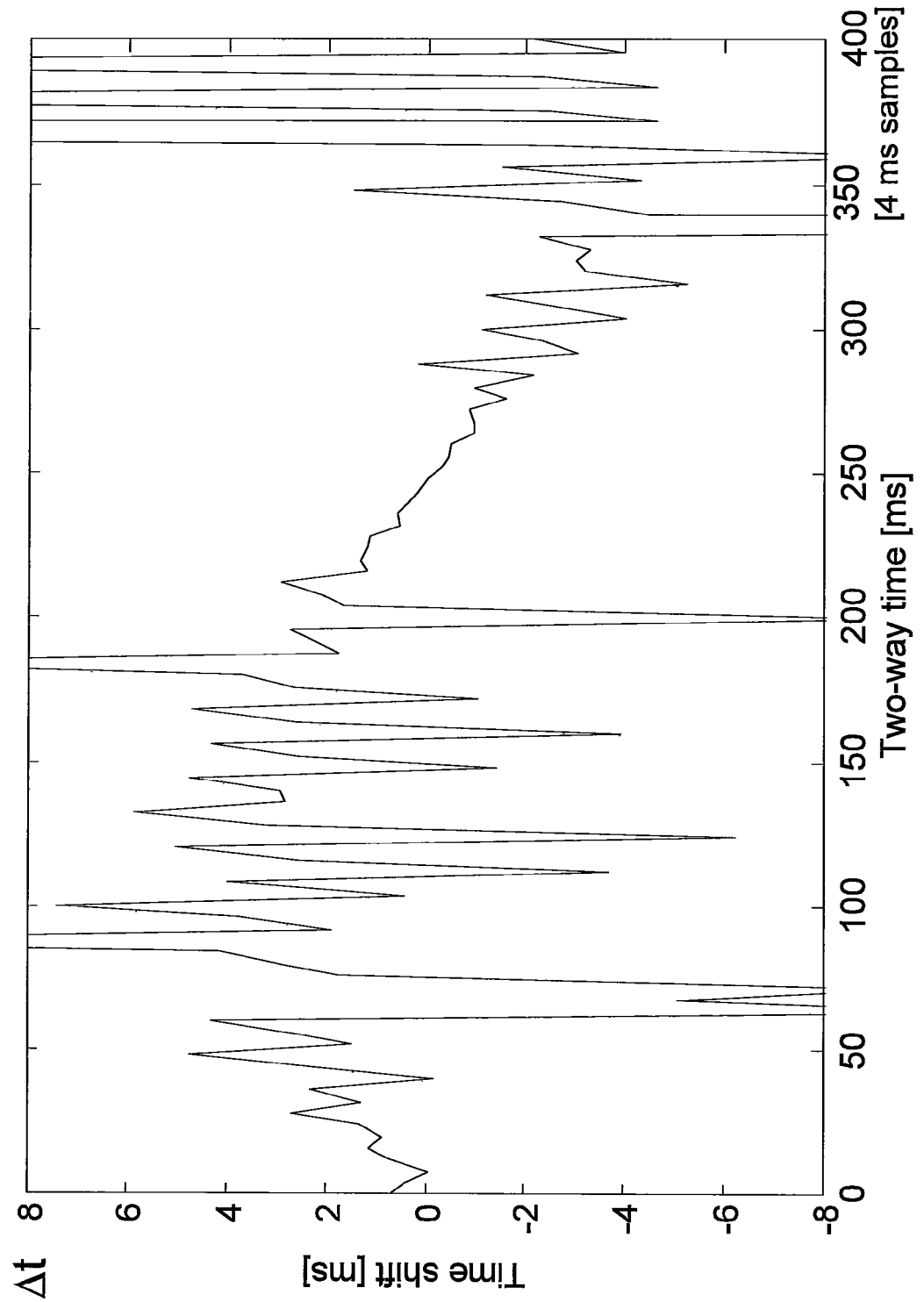
FIG. 2 shows a series of individual time shifts of samples of 4 milliseconds interval as calculated according to background art for adapting the time shifted trace (3) to the synthetic base trace (1) as shown in FIG. 1. The abscissa is two-way time in milliseconds.

The result is illustrated in FIG. 2: the low-frequency sine curve time shift (which is known in our synthetic trace) of the time shifted and new-event trace 3 appears from the curve in addition to the local time shifts required to better fit the time shifted and new-event trace 3 to the base curve 1. This is essentially the same as the non-rigid method but the difficulty lies in stabilizing the solution.

Inclusion of Basis Functions for Estimating Time Shifts

The calculation of time shifts according to the background art requires filtering and individual calculation of displacement of data pixels or voxels in order to better fit a second trace 2 in a second set of traces 20 to a first base trace 1 in a first base set of traces 10.

Figure 3:
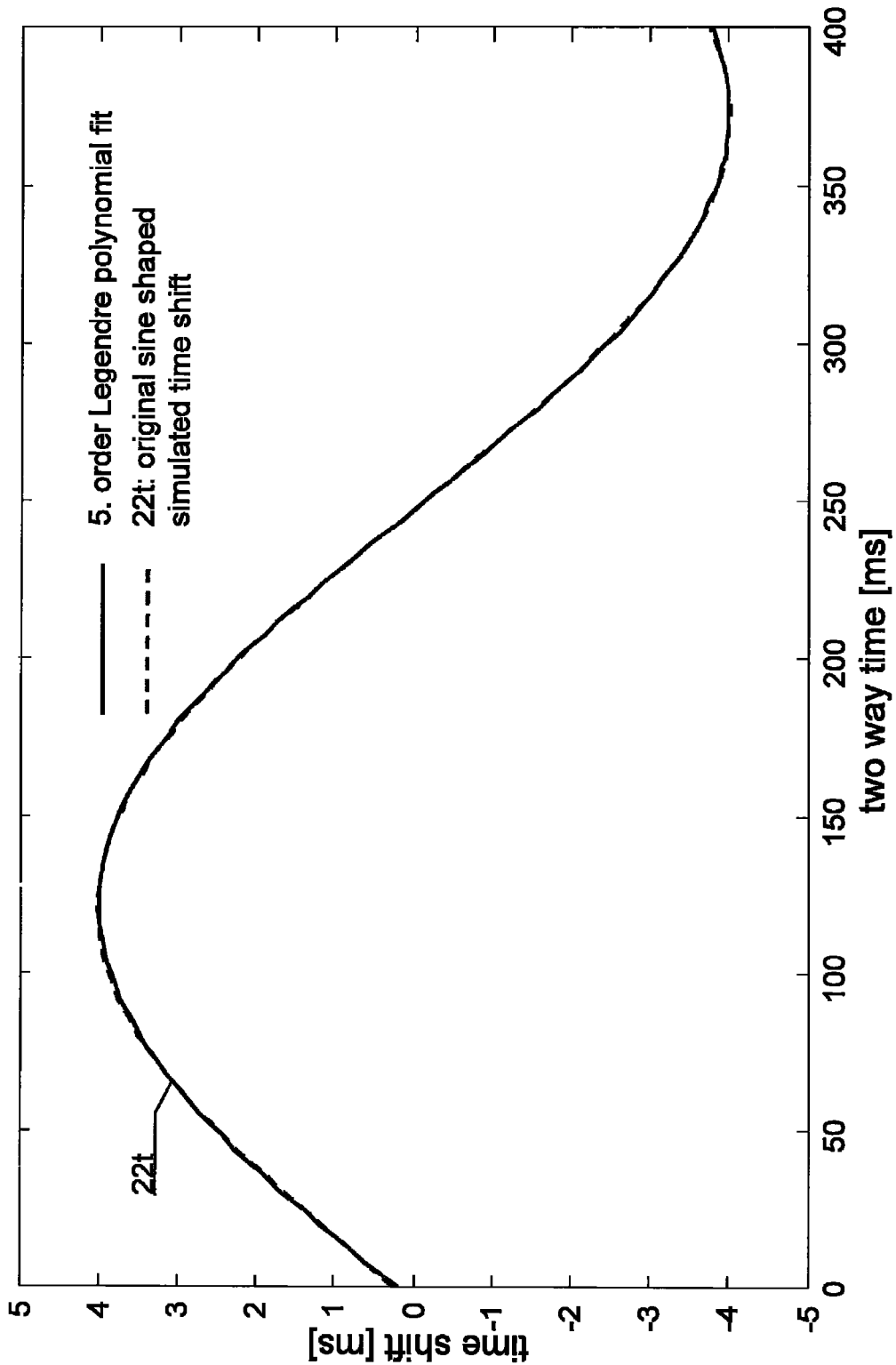
FIG. 3 shows a sine shaped synthetic time shift and a corresponding 5th order Legendre polynomial fit to the synthetic time shift. The abscissa is in two way time in seconds.

Instead of individually calculating the time shift for each and every bit one may save calculation effort by calculating a time shift function for fitting a second trace 2 to a first trace 1 by approximating the time shifts by a polynomial fit. FIG. 3 is an illustration of the ability of a polynomial to fit a given curve, here two almost overlapping curves of a sine shaped time shift and a corresponding curve representing a fifth order Legendre polynomial fit to the sine curve.

$$\Delta t(t) = c_1 L_1(t) + c_2 L_2(t) + \ldots \Lambda$$

Here, $c_1 L_1$, $c_2 L_2$ are the first and second Legendre coefficients and functions, and $\Lambda$ is a remainder error. The abscissa of FIG. 3 is the two way reflection time, in seconds. The ordinate is the time shift in milliseconds. The 5. order Legendre polynomial fit to an extensive degree overlaps the original sine shaped displacement curve which it attempts to represent. The estimated Legendre polynomial is represented by as few as 5 calculated coefficients, whereas the original sine shaped displacement is represented by 100 samples having 4 milliseconds intervals. Thus the polynomial function may be used to enforce smoothness to the time shift function while reducing the numerical complexity of the calculations required to calculate a satisfactory time shift for a pair of traces. Thus typically 128 time shift calculations may be replaced by the calculation of the first five Legendre coefficients $c_1, c_2, \ldots, c_5$. A simplifying feature allowing very good polynomial fit is the fact that the synthetic sine-shaped curve is without noise. This is not the fact for real data. For good approximation of the curves basis functions of several types may be used; the Legendre polynomial approximation is only a good example. Other relevant basis functions which may be used for the purpose of building the curve are Taylor series, Fourier series, and Spline functions.

Results on Synthetic Data without New Seismic Events

Figure 4:
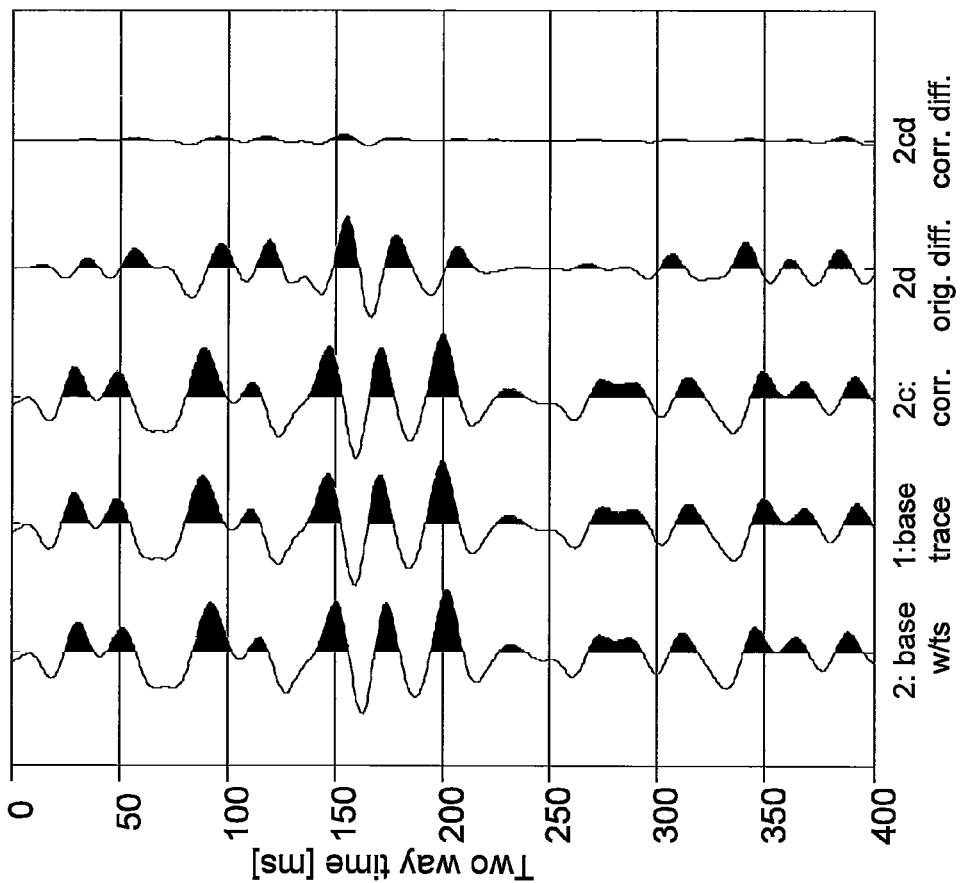
FIG. 4 illustrates results of an embodiment of a method according to the present invention on the synthetic base trace which is given a time shift, but which is not added a new seismic event, and then corrected, and an original difference before correction, and a difference after correction.
Figure 5:
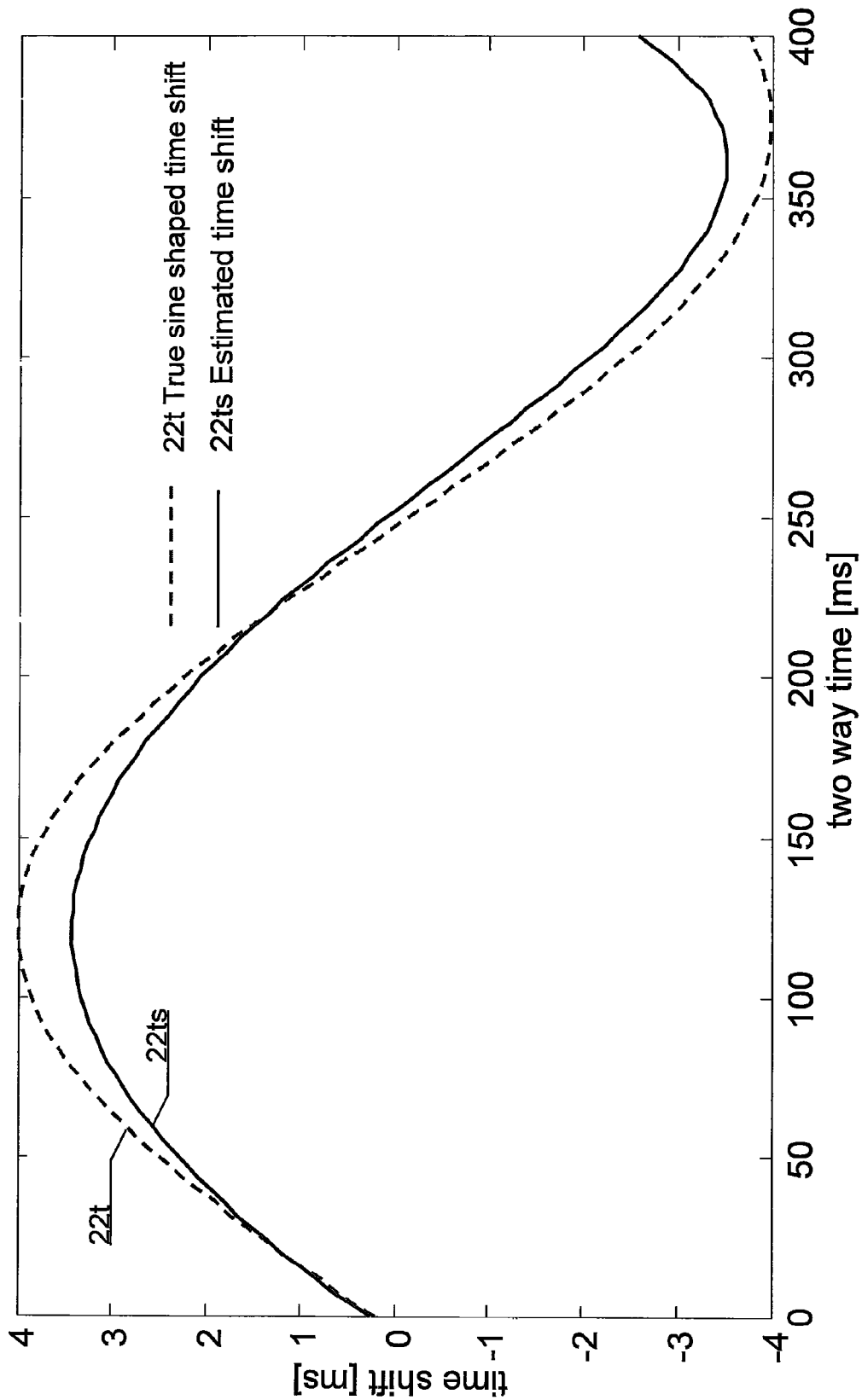
FIG. 5 shows a Cartesian diagram with a comparison of a true sine shaped time shift imposed on a synthetic seismic trace, and an estimated time shift of the synthetic trace based on Legendre Polynomials.

However good an approximation is made on a Legendre polynomial approximation is demonstrated for a portion of a pure, long-wave sine wave as demonstrated above, finding a good set of basis functions representing the time shift of a trace is still not perfect. First, we demonstrate a Legendre polynomial fit for a synthetic base data trace as illustrated in FIG. 4. In the second left column is the synthetic base trace 1 as a function of would-be registered two-way time in seconds. The left column shows the time shifted trace 2 given the 4 ms sine wave shaped time shift 22t illustrated in FIG. 5 in which the true 4 ms sine shaped time shift induced to the base curve 1 to make the time shifted curve 2 is shown by the grey dashed sine curve line 22t. The 5. order Legendre polynomial estimated time shift for correction of the time shifted trace 2 to better fit the base trace 1 is given by the lower amplitude line 22ts. A second iteration would possibly improve the fit but the inventor believes that to achieve a significantly better fit would not be likely on two real data sets acquired during two seismic legs with a time interval of several months or years. The Legendre polynomial estimate corrected trace 2c calculated in this way using the estimated time shift 22ts is shown in the middle portion of FIG. 4. The difference between the time shifted curve 2 and the base trace 1 is given by the difference trace 2d. The difference between the Legendre polynomial estimate time shifted curve 2c and the original base trace 1 is calculated and drawn in the trace named "difference after correction" trace 2cd at the right side of FIG. 4. As can be seen from the corrected trace 2c and the base trace 1 the match is good, which is further supported by the small amplitudes of the difference after correction trace 2cd. Thus, in order to match two time shifted seismic sets 10,20 of seismic traces 1,2 without the presence of a new event, the method of estimating time shifts by calculating coefficients of polynomial functions according to the preferred method is demonstrated to work on these artificial traces.

Problems Related New Seismic Events

Figure 6:
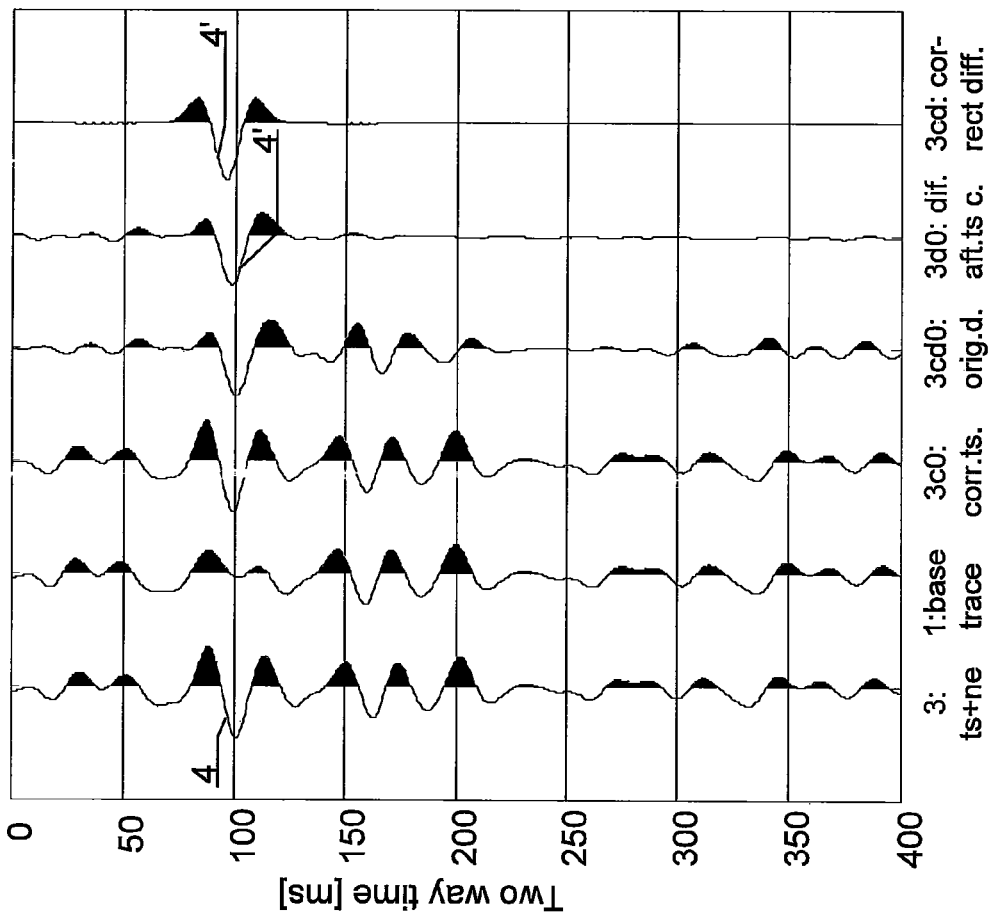
FIG. 6 displays results of an embodiment of a method according to the invention. From left to right is shown the synthetic base trace with a time shift and given a new seismic event, the synthetic base trace, a trace which is time shift corrected only without regard to the new event, a difference trace between the original base trace and the time shifted and new event trace, a trace with the unsuccessfully calculated difference between the base trace and the time shift corrected trace, and a trace with what would have been an ideal time shifted and new event corrected difference between the base trace and the time shifted and new event trace. The latter is the negative image of the new event.
Figure 7:
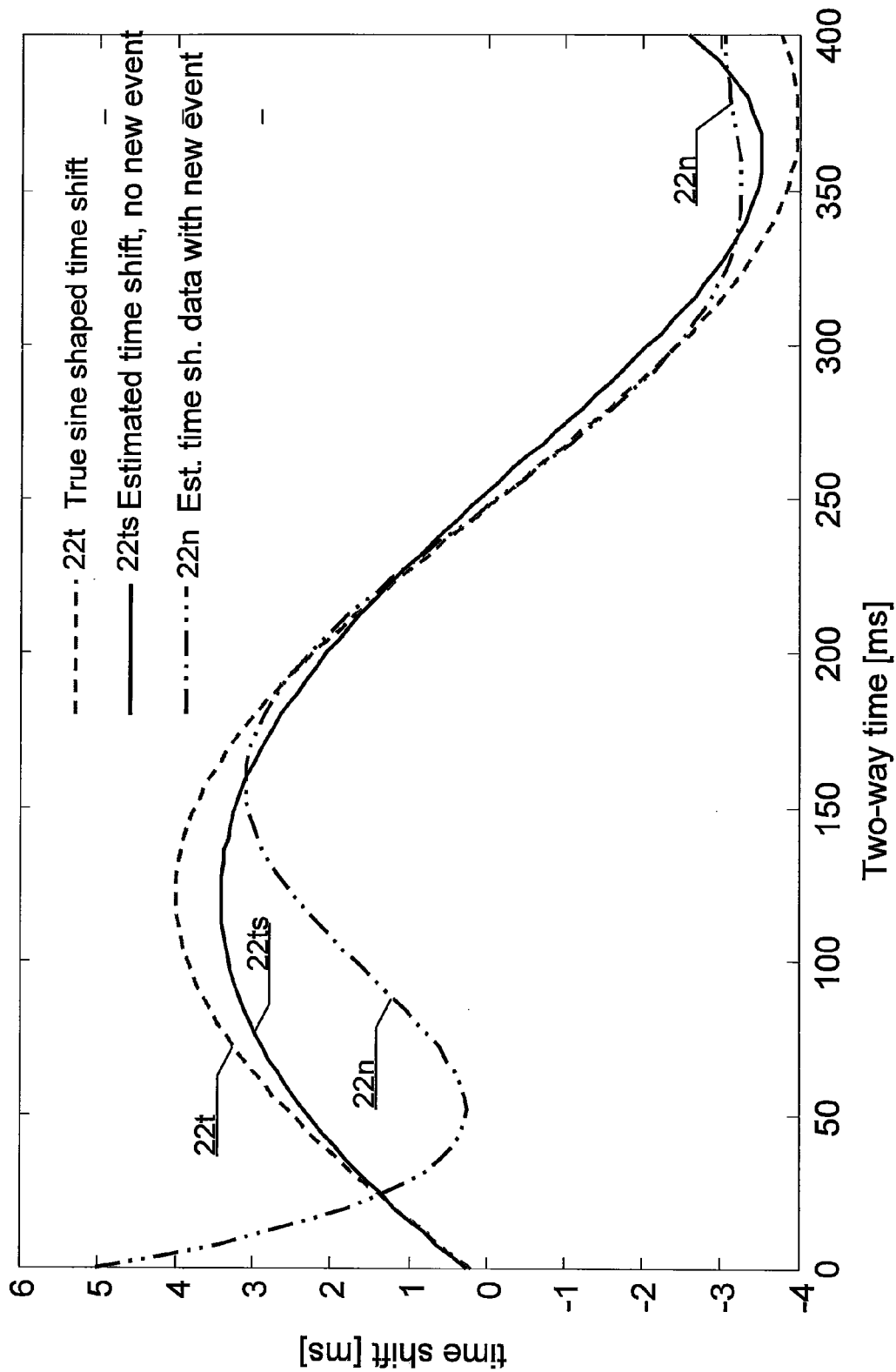
FIG. 7 is similar to FIG. 5 with a Cartesian diagram with a comparison of a true sine shaped time shift and an estimated time shift based on Legendre polynomials only, without a new seismic event, which fits rather well, and with an additional estimated time shift calculated for a trace with a new seismic event as in FIG. 6.

The above improved method will thus reduce the numerical effort required to match two time shifted sets of seismic traces 20,10 compared to the background art method. The improved method also works well for matching the time shifted trace 2 to the base trace 1, as the difference after correction trace 2cd has small amplitudes as shown in FIG. 4. However, if a new event 4 is introduced in a time shifted trace 2, thus forming a "time shifted and new event" trace 3 as shown in the left column of FIG. 6, the method described above may attempt to treat the new event 4 as a seismic event that should have had its counterpart in a non-existent corresponding event in the base trace 1. In FIG. 6, the above method is used for calculating the corrective time shift of the time shifted and new event trace 3 to produce the "time shift corrected but new event" trace 3c0. The difference between the not very successful "time shift corrected but new event" trace 3c0 and the base trace 1 is shown as the initial difference after time shift correction trace 3d0, which has significant false differences above and below the displaced negative image 4' of the new event 4. It seems as if the algorithm has attempted to match the new event in trace 3 with a lower non-relevant wiggle of the base trace 1, resulting in a forced displacement of wiggles that are above and below. The correct difference between the time shifted new event trace 3 and the base trace 1 would have been the so-called correct new event difference 3cd shown in the right hand side curve of FIG. 6. The method both according to the background art and also to the above polynomial approach as such is thus demonstrated to conduct an unsatisfactory matching if a time shifted trace 3 also comprises a new event 4 that is not present in the base trace 1. Further to enforcing a too large, and subsequently a too small, time shift correction shown by curve 22n as seen in FIG. 7 at about a two-way reflection time between 0 to 100 ms, above the actual reflection time about 100 ms for the new event 4 as seen in FIG. 6, and also a too low time shift correction below the actual reflection time of the new event 4 to about 150 ms, the adaptation to the non-matching new event 4 further incurs a false but less significant time shift showing as the small bulge in the portion of curve 22n between 350 ms and 400 ms two-way time. Note the change of scale for the estimated time shift in FIG. 7 as compared to FIG. 5.

Inclusion of New Events

In the formulation of the 4D signal difference between the seismic data as measured $d_m(t)$, and the base data $d_b(t)$, we wrote:

$$d_m(t) - d_b(t) = \left(\frac{\partial}{\partial t}d_b\right)\Delta t + (d_{4D}(t) + \varepsilon) \quad \text{(eq. III)}$$

In this equation everything is known except the time shift $\Delta t$ and the last term $(d_{4D}(t)+\varepsilon)$ is known. Above, we have demonstrated that the method of approaching the matching between the time shifted and new event trace 3 with the base trace 1, under the assumption that the new event was Gaussian noise, was unsuccessful. Knowing the presence of a new reflector represented by the new event 4, the term $d_{4D}(t)$ may be incorporated into the algorithm as time varying noise $\varepsilon_{4D}(t)$ as follows:

$$d_m(t) - d_b(t) = \left(\frac{\partial}{\partial t}d_b\right)\Delta t + (\varepsilon_{4D}(t) + \varepsilon) \quad \text{(eq. V)}$$

Figure 8:
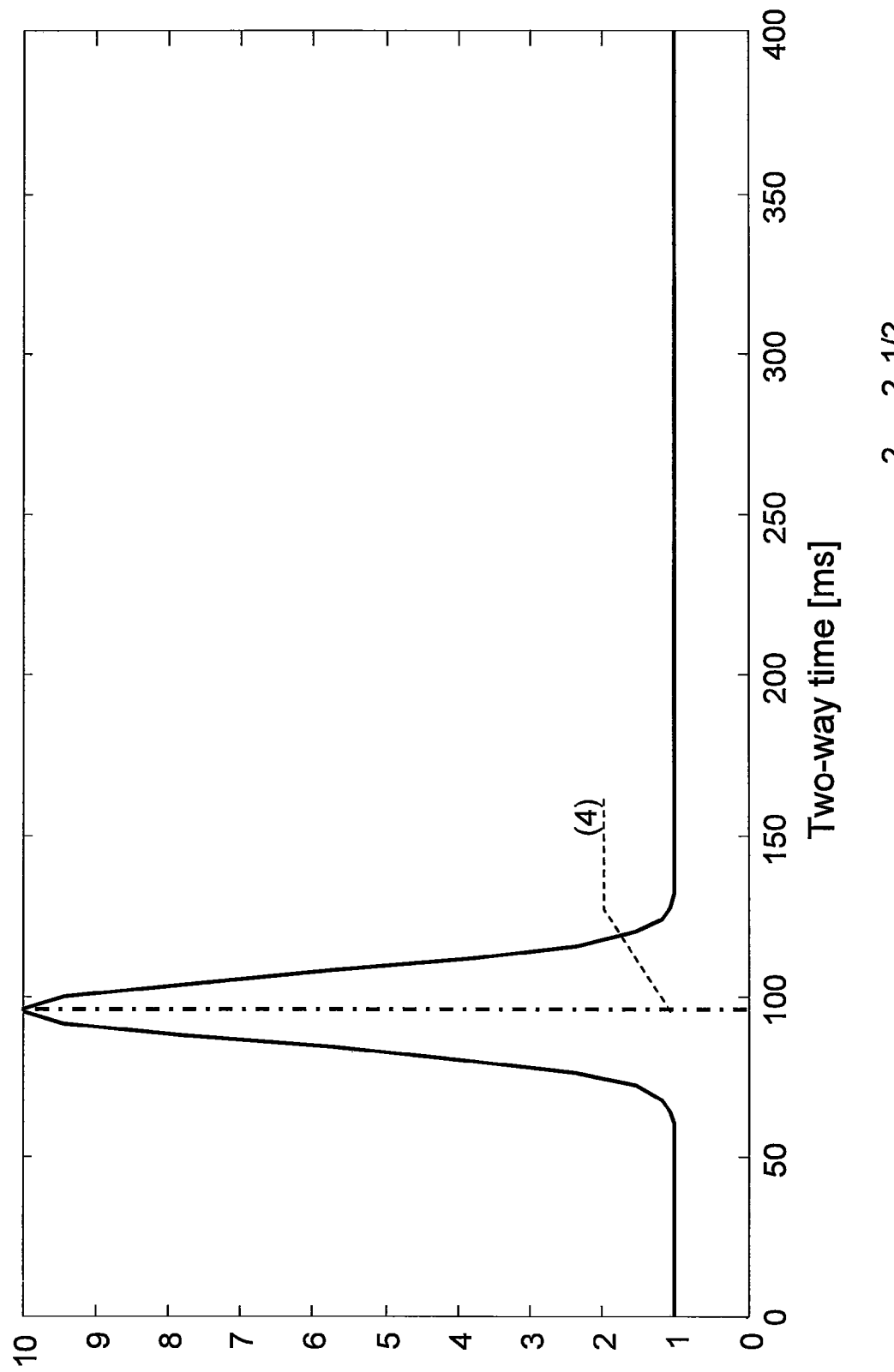
FIG. 8 shows a Cartesian diagram displaying a time varying noise comprising general background noise for the entire two-way reflection time of a trace, and an additional time-specific empirically selected noise based on a new event near 100 ms two-way reflection time.

In this equation, the noise is a time-varying noise which we may use to allow the noise to incorporate the new seismic event 4 locally for the time interval in the trace where it is known to occur, and suppressing the allowed noise to a lower level for other times along the trace time axis. An example of such well-selected time variance is illustrated in FIG. 8.

The noise is usually expressed in terms of variance. A sensible time varying variance representation of the new event 4 could be expressed as a Hilbert transform:

$$\sigma_{4D}(t) = |H(d_{4D}(t))| \quad \text{(eq. VI)}$$

The total variance $\sigma(t)$ is then expressed in the equation:

$$\sigma(t)^2 = |H(d_{4D}(t))|^2 + \sigma_\varepsilon^2 \quad \text{(eq. VII)}$$

in which the additional term $\sigma_\varepsilon$ is variance of time independent noise. As described above, the sine shaped time shift curve 22t of FIG. 3 and also of FIGS. 5, 7, and 10 contains no noise. This is not possible in the algorithm according to the invention so the noise level should be given a value, and is set to 1/10 of the peak of the new event 4 as illustrated in FIG. 8.

Figure 9:
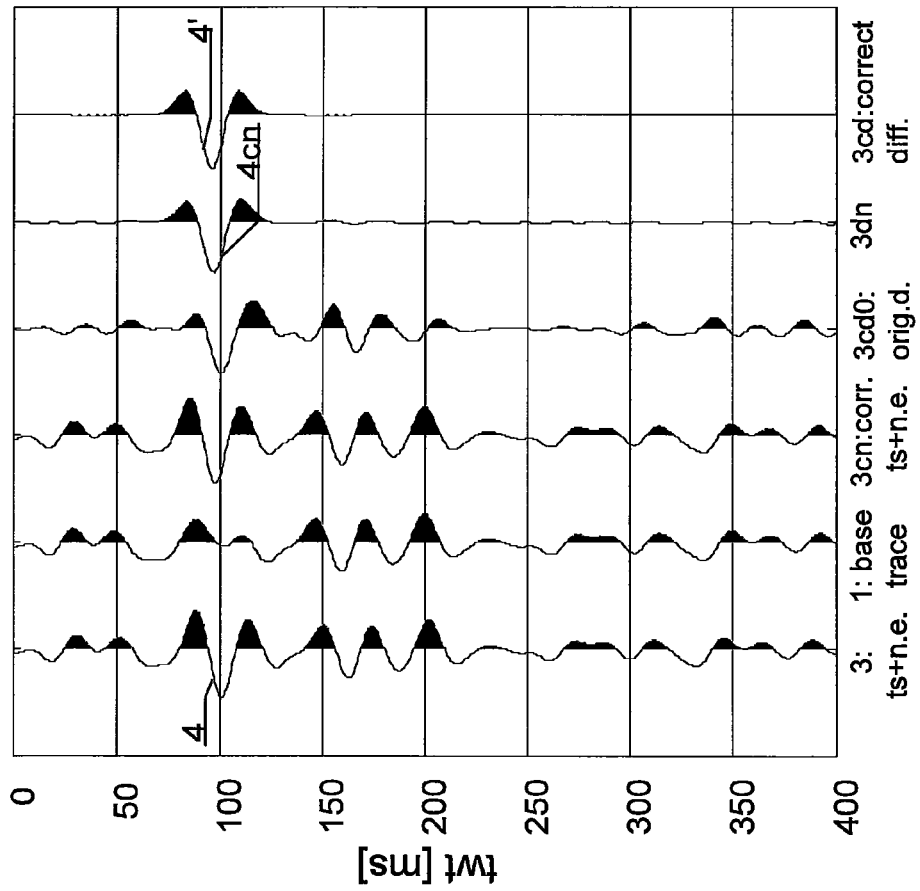
FIG. 9 displays results of an embodiment a method according to the invention on the synthetic base trace with a time shift with a new seismic event in the left column, then the synthetic base trace, then a trace which is time shift corrected also with regard to the new event according to an embodiment of the invention, further showing a difference trace between the original base trace and the time shifted and new event trace, then a trace with the more successfully calculated difference between the base trace and the time shift corrected trace, and, at the right side, a trace with what would have been an ideal time shifted and new event corrected difference between the base trace and the time shifted and new event trace, i.e. the latter is the negative image of the new event, as for FIG. 6.

In FIG. 9, an illustration is made showing the above described improved method used for calculating the corrective time shift of the "time shifted and new event" trace 3 to produce the "time shift and new event corrected" trace 3cn. The difference between the more successful "time shift and new event corrected" trace 3cn and the base trace 1 is shown as the initial difference after time shift and new event correction trace 3dn, which has highly attenuated false differences above and below a now more correctly placed negative image 4cn of the new event 4. It seems as the new algorithm according to the preferred method has more successfully incorporated the new event 4 in trace 3 without attempting to match the new event 4 with any above or below non-relevant wiggles of the base trace 1. This has the advantage of a significantly reduced amount of false time shift displacement of above and below time shift corrected wiggles. The wiggles of the base trace 1 and the wiggles of the "time shifted and new event corrected" trace 3cn immediately above and below the actual time (or actual depth, if the trace is converted to depth) of the new event 4 now correspond to a high degree. The correct difference between the time shifted new event trace 3 and the base trace 1 is the trace called "correct new event difference 3cd shown in the right part of FIG. 9, as for FIG. 4. The method both according to the embodiment of the present invention comprising the time-varying noise in addition to the polynomial approach as such is thus demonstrated to provide a much improved matching of a time shifted trace 3 also comprising a new event 4 not present in the base trace.

As was observed in FIG. 7 and which is repeated in FIG. 10, a too large and subsequently too small time shift correction was enforced in the immediate vicinity of the actual reflection time by the polynomial approach having no regard to the new event 4 about 100 ms two-way time, as shown by the estimated time shift curve 22n indicated as a dash-dot-dot line. However, with the inclusion of the time varying variance in the time shift algorithm, the new adaptation to the non-matching new event 4 provides a significantly improved time shift correction shown by the estimated "time shift and new event correction" curve 22tse indicated as a dash-dot line, a curve which better resembles the true sine shaped time shift curve 22t. As was seen in FIG. 9, the improved algorithm according to this embodiment of the invention has more successfully incorporated the new event 4 in the time shift correction curve 22tse without being forced to match the new event (4 of FIG. 9) with any above or below non-relevant wiggle of the base trace (1 of FIG. 9). This has the advantage of a significantly reduced amount of false time shift displacement of above and below time shift corrected wiggles, as clearly is the problem of estimated time shift correction curve 22n which is the result of attempting to adapt the new event 4 to non-relevant reflections. The method both according to the embodiment of the present invention comprising the time-varying noise in addition to the polynomial approach as such is thus demonstrated to provide a much improved time shift correction as illustrated by curve 22tse also allowing the inclusion in the time shifting process of the new event 4 not present in the base trace 1.

Estimation of Time Varying Variance for Real Seismic Data

For real data, a difficult task is to estimate the required time varying variance. Such a time varying variance was illustrated in a simplified manner in FIG. 8 for one single trace for one single time event 4. The motivation for correcting the seismic trace for time shift is to better see the new events. That is, the information we want out of the time shift correction process for adapting a time shifted set of traces also comprising a new seismic event to a previously acquired base trace not comprising the later occurring seismic event, is much similar to the information we put in. Fortunately, the input to the algorithm according to the embodiment of the invention allows a quite crude estimate of the suspected new event time varying noise representation, and still refines the result to a significant degree. An example from the Grane petroleum field in the North Sea is given below.

FIG. 11 is an original raw difference between a seismic section of reflection traces comprising a first set of base traces 1 of a first set of seismic data 10 acquired at a first time $t_0$ at the Grane field, and a generally time-shifted second set of seismic traces 3 of seismic data 30, the second set of seismic data 30 being acquired at a second time t. The second set of seismic traces 30 includes new events 4. The data contains significant time shift due to injected gas. The new events 4 appear in several traces forming a so-called "flat spot" series 40 of traces 3 appearing on top of what is believed to be the strata containing the injected gas.

FIG. 12 is identical to FIG. 11 with the above-mentioned "flat spot" as indicated along the upper, centrally positioned strong reflection 40 indicated by a broken line at about 65 ms two-way reflection time and in the range between about 180 m and about 440 m along the section.

FIG. 13 is the flat spot series of the seismic section difference of FIGS. 11 and 12 interpreted as time varying variance such as illustrated in FIG. 8. The interpreted flat spot is modelled with a 35 Hz Ricker wavelet and an amplitude taken from the original flat spot difference between the first seismic data set 10 and the seismic data set 30 containing the new events 4. The weight function is defined as follows:

$$w = \frac{\sigma_\varepsilon^2}{\sigma_{4D}(t)^2 + \sigma_\varepsilon^2} \quad \text{(eq. VIII)}$$

FIG. 14 illustrates an estimated time shift calculated according to the present invention estimating the time shift between a real base set of seismic data 10 and the later acquired time shifted, new event—containing, real seismic data set 30 using polynomial approximation, but not including the embodiment of the invention adapting the time shift correction to time varying variance due to the new event 4. The strong "new event" 4 interpreted reflection horizon 40 at about 250 ms is indicated. In the offset range 200 m to 260 m there is a strong negative time shift imposed onto the later seismic data set 30 particularly above, but also below the series 40 of strong new events 4 when no consideration is taken to the series 40 of strong new events 4. Below the series one may assume that the data contains significant time shifts due to injected gas. A strong positive time shift group is also seen in the range high above the series 40 of new events, at about 100 ms two-way time and in the offset range between 220 m and 270 m.

FIG. 15 illustrates the same section as FIG. 14 except for the time shift being calculated according to an embodiment of the present invention including the use of the method of adapting to time varying variance due to the new events 4. Here, in the same offset range 200 m to 260 m, the time shift imposed onto the later seismic data set 30 both above, but also below the series 40 of strong new events 4 is significantly reduced when consideration is taken to the series 40 of strong new events 4. Further, the strong positive time shift group that occurred in the high above the series 40 of new events, at about 100 ms two-way time and in the offset range between 220 m and 270 m, is significantly less expressed in FIG. 15. This indicates that the time shifts imposed by the method not taking into consideration the presence of a series 40 of new events 4 enforces a non-real time shift correction onto part of the seismic section, as part of the time shifts calculated in the vicinity of the new events 4 series 40 are significantly less when taking into consideration the time varying variance built on the series of new events. However, a dark, shadow-like group of strong, negative time shifts appearing in the time span between about 300 ms and about 360 ms in the offset range from about 310 m to about 340 m prevails from in FIG. 14 to FIG. 15 and is considered to be of material origin. Further, in the deeper time section from about 400 ms to about 460 or even near 500 ms, the estimated time shifts for offsets between 210 m and 380 m has little time shift difference between the two methods. This is a further indication that those calculated time shifts are real. A 3-D "time-horizontal" section through the level of about 440 ms two-way reflection time would indicate small estimated time shift values in the offset range up to about 190 m, then a long range up to about 380 or even 420 m with high time shift values, followed by a generally low time shift to offsets out to 600 m. The image is generally the same in this range both in FIG. 14 and in FIG. 15. In the present case this may indicate an introduction of gas in the indicated depths and offset range.

The 4-D seismic set comprising first and second seismic data sets 10,30 contains both time shifts and amplitude changes. One purpose of the present method is to separate time shift effects on the seismic data sets 10,30 from amplitude changes on the same seismic data sets, so as for studying the time shifts as such, and to study seismic amplitude changes as such. If seismic data can be inverted based on well established amplitudes, an improved assessment of the amount of gas injected may be provided.

Thus the preferred embodiments may provide a good match between time shifted seismic data sets using a basic function calculation that requires less calculation effort than the background art methods calculating individual time shifts for every time sample. An embodiment of the present invention is further capable of calculating time shifts under the presence of a new event 4 occurring in the second set of seismic data without forcing false time shifts into the seismic data under the constraint of the lateral series 40 of new seismic events 4.

By knowing the materially caused time shifts and their depths, the change of seismic impedance may be calculated. The change in seismic impedance may be either due to a change in seismic velocity or density, or both, of the geological layers in question. Knowing such parameters about the material changes of the geological strata may provide key information input to how to control the petroleum fluid production such as adjusting the production rate of gas or petroleum, adjusting the depth of which petroleum fluids are produced, or determining injection rates of gases or fluids in order to support the petroleum fluid production.

Embodiments of the present invention have been described with particular reference to the examples illustrated. However, it will be appreciated that variations and modifications may be made to the examples described within the scope of the present invention.

APPENDIX

Time Shift Estimation from Time Lapse Seismic

Espen Oen Lie

Feb. 25, 2008

1 Mathematical Model

The model used for estimating time shift, is derived using quite simple assumptions.

$$d_m(t) = d_b(t + \Delta t) + d_{4D}(t) + \epsilon \quad (1)$$

Expand the Maclaurin series for this equation in $\Delta t$ $$d_m(t) = d_b(t) + (\partial_t d_b)\Delta t + O(\Delta t^2) + d_{4D}(t) + \epsilon \quad (2)$$

Rearranging and dropping second (and higher) order terms $$d_m(t) - d_b(t) = (\partial_t d_b)\Delta t + d_{4D}(t) + \epsilon \quad (3)$$

Some notes
- If ware drop the term containing Δt we get the normal interpretation of time lapse difference cubes. That is, that difference is purely related to amplitude effects and noise
- If we drop the amplitude effect ($d_{4D}(t)$) we get the same equations that can be used to derive Horn-Schunk method that is used in NRM We will omit $d_{4D}(t)$ term temporarily to derive the basics of the method. The amplitude term will be included later. We can know write down a compact version of the equation $$\Delta d = D\Delta t + \epsilon \quad (4)$$

where $\Delta d$ is $d_m(t) - d_b(t)$ and D is a diagonal matrix with $\partial_t d_b$ on the diagonal. This equation can be inverted directly $\Delta t = D^{-1}\Delta d$, but that would neither be mathematically nor physically sensible. The result would be very noisy and unphysical. From a physics point of view timeshifts should be quite smooth both vertical and lateral. Perhaps except around faults. We can believe in discontinuous velocity changes, but the resulting timeshifts will still be continuous vertically.

The smoothness constraint adapted in this method is based on basis functions. Instead of working with Δt directly, we claim that this function can be sufficiently represented by a set of basis functions. Any set of functions can be used, but at the moment bsplines are preferred. Introduction of basis functions can be expressed as $$\Delta t = Fc \quad (5)$$

F is a $n_t \times n_f$ matrix containing the $n_f$ basis functions. $n_f$ is typically much less than $n_t$. Inserting this gives $$\Delta d = DFc + \epsilon \quad (6)$$

Note that DF do not require matrix multiplication since D is diagonal. We would rather construct a matrix containing all basis functions times $\partial_t d_b$. This equation can easily be inverted in a least squares sense and the result is perfectly stable for synthetics containing just time shifts. The solution is $$c = (F^T DF)^{-1} F^T \Delta d \quad (7)$$

$$\Delta t = F(F^T DF)^{-1} F^T \Delta d \quad (8)$$

This can be referred to as the 1D solution to the problem.

1.1 Lateral Constraint

The 1D solution is sufficient for synthetic data, but real seismic contains a lot of effects that cannot be modelled with these simple equations. The common approach to these effects is to consider everything else as noise. The same approach will be taken here and we will assume that the time shifts are smoother that this "error". A possible solution is to introduce 2D basis functions. This will however impose a very strong constraint that will disregard faults and other less smooth features in the seismic.

We will assume that the time shift change from trace to trace is gaussian. This assumption is mainly pragmatic with following pros:
- Constraint and solution is global (no sliding windows)
- Solution is very fast
- Quite flexible regarding lateral time shift change The most important con is that the assumption is somehow dubious. We have no statistical analysis of the problem, but still utilize a statistical method for its solution.

By imposing a statistical assumption the solution is as usual bayesian. For completeness the equations are included $$p(c|d) \propto p(c)p(d|c) \quad (9)$$

where d is the measured data and c is the desired parameters. Our guassian prior can be expressed as $$p(c_{j,k}) \propto \exp[-(F(c_{j,k} - c^0_{j,k}))^T C_c^{-1} (F(c_{j,k} - c^0_{j,k}))] \quad (10)$$

$$c^0_{j,k} = \frac{1}{4}(c_{j-1,k} + c_{j+1,k} + c_{j,k-1} + c_{j,k+1}) \quad (11)$$

where j and k relates to spatial sampling. Note that our basis functions in F are included. This is because it is time shifts and not, basis function coefficients that are compared. $C_c$ is the covariance matrix for the prior. The likelihood is as usual $$p(d_{j,k}|c_{j,k}) \propto \exp[-(D_{j,k}Fc_{j,k} - \Delta d_{j,k})^T C_\epsilon^{-1} (D_{j,k}Fc_{j,k} - \Delta d_{j,k})] \quad (12)$$

Where $C_\epsilon$ is the covariance matrix. Note that the likelihood is local. The maximum probability solution to this problem is $$c_{j,k} = [(D_{j,k}F)^T C_\epsilon^{-1} D_{j,k}F + F^T C_c^{-1} F]^{-1} \quad (13)$$

$$[(D_{j,k}F)^T C_\epsilon^{-1} \Delta d_{j,k} + F^T C_c^{-1} Fc^0_{j,k}] \quad (14)$$

$$= [F^T D_{j,k}^T C_\epsilon^{-1} D_{j,k} F + F^T C_c^{-1} F]^{-1} \quad (15)$$

$$[F^T D_{j,k}^T C_\epsilon^{-1} \Delta d_{j,k} + F^T C_c^{-1} Fc^0_{j,k}] \quad (16)$$

$$\equiv (L_{j,k} + \Gamma)^{-1}(b_{j,k} - \Gamma c^0_{j,k}) \quad (17)$$

This solution is however nonlocal since $c_{j,k}^0$ is nonlocal. It is not possible to solve the problem as stated here, but it is a illuminating way of looking at it. (Actually it is the Jacobi iteration scheme, but that is to slow for our purpose)

1.2 Solution as Linear System of Equations

There are se several ways to solve this system of equations, but we should point; out the size of the problem. We have $n_f$ basis functions, $n_i$ inlines and $n_x$ crosslines. This makes the matrix $n_f n_i n_x \times n_f n_i n_x$ which would typically be 20000000×20000000. So we need to utilize the structure of the matrix which is very sparse (and banded). We will end up with a Conjugated Gradients method for solution, but first we will rearrange the equations for this purpose.

$$(L_{j,k} + \Gamma)c_{j,k} - \frac{1}{4}\Gamma(c_{j-1,k} + c_{j+1,k} + c_{j,k-1} + c_{j,k+1}) = b_{j,k} \quad (18)$$

This results in a banded system that can be written as $$\begin{pmatrix} T_1 & -D_\Gamma & 0 & 0 & \cdots \\ -D_\Gamma & T_2 & -D_\Gamma & 0 & \\ 0 & -D_\Gamma & T_3 & -D_\Gamma & \\ \vdots & & & & \ddots \end{pmatrix} \begin{pmatrix} c_1 \\ c_2 \\ c_3 \\ \vdots \end{pmatrix} = \begin{pmatrix} b_1 \\ b_2 \\ b_3 \\ \vdots \end{pmatrix} \quad (19)$$

$$T_j = \begin{pmatrix} L_{j,1} & -\Gamma & 0 & 0 & \cdots \\ -\Gamma & L_{j,2} & -\Gamma & 0 & \\ 0 & -\Gamma & L_{j,3} & -\Gamma & \\ \vdots & & & & \ddots \end{pmatrix}, \quad c_j = \begin{pmatrix} c_{j,1} \\ c_{j,2} \\ c_{j,3} \\ \vdots \end{pmatrix}, \quad b_j = \begin{pmatrix} b_{j,1} \\ b_{j,2} \\ b_{j,3} \\ \vdots \end{pmatrix} \quad (20)$$

where $D_\Gamma$ is a block diagonal matrix with Γ on its diagonal.

For numerical purposes Γ can be eliminated off diagonal:

$$\begin{pmatrix} \hat{T}_1 & -I & 0 & 0 & \cdots \\ -I & \hat{T}_2 & -I & 0 \\ 0 & -I & \hat{T}_3 & -D_\Gamma \\ \vdots & & & & \ddots \end{pmatrix} \begin{pmatrix} c_1 \\ c_2 \\ c_3 \\ \vdots \end{pmatrix} = \begin{pmatrix} \hat{b}_1 \\ \hat{b}_2 \\ \hat{b}_3 \\ \vdots \end{pmatrix} \quad (21)$$

$$\hat{T}_j = \begin{pmatrix} \Gamma^{-1}L_{j,1} & -I & 0 & 0 & \cdots \\ -I & \Gamma^{-1}L_{j,2} & -I & 0 \\ 0 & -I & \Gamma^{-1}L_{j,3} & -I \\ \vdots & & & & \ddots \end{pmatrix}, \quad (22)$$

$$\hat{b}_j = \begin{pmatrix} \Gamma^{-1}b_{j,1} \\ \Gamma^{-1}b_{j,2} \\ \Gamma^{-1}b_{j,3} \\ \vdots \end{pmatrix} \quad (23)$$

1.3 Spesifying covariances—inclusion of prior knowledge

In addition to basis functions (that must be specified) two covariance matrices enters the equations. These must be specified and has separate use The simplest approach is to say that, we don't know anything more than the fact that we want a smooth result. In this case covariances are diagonal and constant. Then only $\sigma_\epsilon/\sigma_c$ enters, which can be interpreted as a noise to signal ratio. Or a weight function.

Up to know we have ignored $d_{4d}$, that is the desired amplitude effect. All other methods consider this as noise, and we will to, but with spatial varying variance. $C_\epsilon$ is the covariance, that up to know has been considered constant. We will assume zero temporal correlation, so that $C_\epsilon$ is diagonal, but with a temporal and spatial varying variance ($C_\epsilon = C_{j,k}^\epsilon$). The suggested actual implementation of this is that we model out 4D amplitude effect prior to timeshift estimation. This can be done by using a interpreted horizon and a ricker wavelet with frequency equivalent to seismic. Amplitudes can be taken from initial difference cube. Note that our basis functions interpolate over the modelled area so that main effect is that this is weighted down (it has no direct effect on time shifts). Since variances are equivalent to (energies, we need to make our modelled 4D effect into energy. By using the Hilbert transform we both remove phase, make the variance quite smooth and ensure that energy is consistent (the total energy of a signal is constant after a Hilbert transform). Our time dependent, variance is then $$\sigma_{4D}(t) = |H(d_{4D}(t))| \quad (24)$$

where $H(\cdot)$ is the Hilbert transform. Which gives the total variance $$\sigma_\epsilon(t)^2 = \sigma_{4D}(t)^2 + \sigma^2 \quad (25)$$

where $\sigma^2$ is the noise variance in classical sense. This will be the diagonal of $C_{j,k}^\epsilon$, which is diagonal.

The second covariance $C_c$ can also be used to include prior knowledge. This is related to how similar timeshifts are laterally. Timeshifts are believed to be similar laterally when inside a homogeneous compartment. That is a geological unit. Timeshifts are not necessarily continuous over faults and other geological borders. This can be included through $C_c$. Note that such inclusions are likely to induce timeshifts consistent with input constraints, thus geologic al models should perhaps not be used. This due to the fact that their borders are subject to some guesswork. Fault attributes or other data driven measures are more appropriate. Again, the variance, which it is, should be in terms of energy.

Note that both $C_\epsilon$ and $C_c$ should be normalized so that $C_c = \sigma_c I_c$ where $I_c$ is larger than 1 on diagonal. This results in $I_c^{-1}$ being a less than 1 on diagonal and reduce or keep numbers in F. This should be done globally so that the input is $I_\epsilon$, $I_c$ and $$\frac{\sigma_\epsilon}{\sigma_c}.$$

This also implies separating the structural input information and the degree of smoothing. In addition to practical aspects this ensures numerical stability.

2 Numerical Solution

The best tested technique is conjugated gradients (CG). This offers a tremendously speed up compared to the initially tested Gauss-Seidel. One of CGs strengths is that it only needs matrix-vector products and not matrix in inversions. Due to the structure of our system, matrix-vector products are quite cheap:

$$q = Ap \quad (26)$$

$$q_{j,k} = \Gamma^{-1}L_{j,k} p_{j,k} - \frac{1}{4}(p_{j+1,k} + p_{j-1,k} + p_{j,k+1} p_{j,k-1}) \quad (27)$$

We are of course not, doing the $\Gamma^{-1}L_{j,k}$ every iteration, this is just to keep notation simple.

The actual algorithm is as following:

```
Compute r⁰ = b - Ax⁰ for some initial guess x⁰
for i = 1:maxjt
    ρⁱ⁻¹ = rⁱ⁻¹ᵀrⁱ⁻¹
    if i = 1
        p¹ = r⁰
    else
        βⁱ⁻¹ = ρⁱ⁻¹/ρⁱ⁻²
        pⁱ = rⁱ⁻¹ + βⁱ⁻¹pⁱ⁻¹
    endif
    qⁱ = Apⁱ
    αⁱ = ρⁱ⁻¹/pⁱᵀqⁱ
    xⁱ = xⁱ⁻¹ + βⁱp(i)
    rⁱ = rⁱ⁻¹ - βⁱq(i)
    check convergence; continue if necessary
end
```

The invention claimed is:

1. A method for calculating time shifts for detecting material changes in petroleum bearing strata during petroleum production activities, the method comprising the steps of:
   providing a first seismic reflection data set of first reflection traces comprising a first series of reflections acquired at a first time ($t_0$);
   providing a second seismic reflection data set of second reflection traces comprising a second series of reflections acquired at a first time (t), generally corresponding to said first series of reflections, wherein the first seismic reflections data set and the second seismic reflection data set are from at least one seismic sensor;
   comparing the first and second traces to determine time shifts between events in the first and second traces;
   matching a basis function to the time shifts by calculating coefficients of the basis function to obtain a match; and applying the basis function to at least one of the first and second traces to provide time-matched first and second trances, wherein the first reflection traces and second reflection traces are representative of the petroleum bearing strata.

2. The method according to claim 1, wherein the coefficients of the basis function comprise coefficients of Spline functions, coefficients of Legendre polynomials, coefficients of Taylor series, or coefficients of Fourier series.

3. The method according to claim 1, further comprising the steps of:
identifying new seismic events of at least one laterally extending series in the second traces not present in the first traces; and
interpreting the new events as time varying variance in addition to a time invariant noise outside the new seismic events.

4. The method according to claim 3, wherein the identification of said new seismic events comprises the steps of:
calculating the amplitude of a subtraction of said first set of seismic data from said second set of seismic data;
multiplying said amplitude with a weight function depending on said time invariant noise and said time varying variance; and
convolving with a seismic pulse function.

5. The method according to claim 4, wherein said seismic pulse function is a Ricker pulse.

6. The method according to claim 1, wherein a separation between said first time ($t_0$) and said later time (t) extends over two or more months.

7. The method according to claim 1, further comprising the step of displaying said calculated reflection time shifts of said second series of reflections of said second reflection traces as a function of reflection time, along seismic profile lines.

8. The method according to claim 1, further comprising the step of acquiring the first seismic reflection data set and the second seismic reflection data set.

9. The method according to claim 1, further comprising the step of conducting petroleum production activities.

10. The method according to claim 1, wherein the comparing step comprises the step of forming a difference between each first trace and a corresponding second trace and dividing the difference by the first derivative with respect to time of the second trace.

11. The method according to claim 1, further comprising the step of using the calculated time shifts to detect material changes in the petroleum bearing strata.

12. A method of determining or detecting a change in a geophysical property of a subterranean region of the earth, comprising the step of performing the method according to claim 1, said method further comprising the step of:
determining from the time-matched first and second traces a change in the geophysical property of the region between the first and later times.

13. The method according to claim 1, further comprising using the calculated time shifts during petroleum production activities.

14. The method according to claim 13, wherein the step of using the calculated time shifts during petroleum production activities comprises the step of:
monitoring or controlling petroleum fluid production;
adjusting the production rate of gas or petroleum;
adjusting the depth of which petroleum fluids are produced; or
determining injection rates of gases or fluids in order to support the petroleum fluid production.

15. The method according to claim 12, further comprising the step of using the determined change in the geophysical property during petroleum production activities.

16. The method according to claim 15, wherein said step of using the determined change in the geophysical property during petroleum production activities comprises the step of:
monitoring or controlling petroleum fluid production;
adjusting the production rate of gas or petroleum;
adjusting the depth of which petroleum fluids are produced; or
determining injection rates of gases or fluids in order to support the petroleum fluid production.

17. An apparatus for calculating time shifts for detecting material changes in petroleum bearing strata during petroleum production activities, comprising:
means for providing a first seismic reflection data set of first reflection traces comprising a first series of reflections acquired at a first time ($t_0$);
means for providing a second seismic reflection data set of second reflection traces comprising a second series of reflections acquired at a later time (t), generally corresponding to said first series of reflections;
means for comparing the first and second traces to determine time shifts between events in the first and second traces;
means for matching a basis function to the time shifts by calculating coefficients of the basis function to obtain a match; and
means for applying the basis function to at least one of the first and second traces to provide time-matched first and second traces.

18. The method according to claim 3, wherein the step of calculating coefficients of the basis function includes calculating the basis function coefficients while allowing for the time varying variance near the new seismic events and the time invariant noise away from the new seismic events.

19. The method according to claim 1, wherein the step of calculating coefficients of the basis function includes calculating the basis function coefficients while allowing for time invariant noise in the first and second traces.

* * * * *

UNITED STATES PATENT AND TRADEMARK OFFICE
CERTIFICATE OF CORRECTION

| | |
|---|---|
| PATENT NO. | : 8,259,531 B2 |
| APPLICATION NO. | : 12/415264 |
| DATED | : September 4, 2012 |
| INVENTOR(S) | : Espen Oen Lie |

It is certified that error appears in the above-identified patent and that said Letters Patent is hereby corrected as shown below:

IN THE CLAIMS:

In claim 1, at column 17, line 3, change "trances" to --traces--.

Signed and Sealed this
First Day of January, 2013

David J. Kappos
*Director of the United States Patent and Trademark Office*